United States Patent
Suwabe et al.

(10) Patent No.: US 8,305,603 B2
(45) Date of Patent: Nov. 6, 2012

(54) JOB PROCESSING APPARATUS COORDINATING UPDATE OF SOFTWARE USED IN JOB EXECUTION AND CONTROL METHOD THEREOF

(75) Inventors: Takeshi Suwabe, Tokyo (JP); Tomoaki Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1313 days.

(21) Appl. No.: 11/539,896

(22) Filed: Oct. 10, 2006

(65) Prior Publication Data

US 2007/0080776 A1   Apr. 12, 2007

(30) Foreign Application Priority Data

Oct. 12, 2005   (JP) ................................. 2005-298100

(51) Int. Cl.
*G06F 3/12*   (2006.01)
(52) U.S. Cl. ...... 358/1.15; 358/1.18; 358/1.1; 358/1.13; 358/402
(58) Field of Classification Search .................... 358/1.1, 358/1.15
See application file for complete search history.

(56) References Cited

U.S. PATENT DOCUMENTS

| | | | |
|---|---|---|---|
| 2002/0184350 A1* | 12/2002 | Chen | 709/221 |
| 2003/0025927 A1* | 2/2003 | Hino et al. | 358/1.13 |
| 2003/0035124 A1* | 2/2003 | Tomita et al. | 358/1.8 |
| 2005/0141025 A1* | 6/2005 | Hanada | 358/1.15 |

FOREIGN PATENT DOCUMENTS

JP   2003-054087   2/2003

OTHER PUBLICATIONS

Atsushi Tomita, Image Processor, Image processing method and, JP2003-054087,Feb. 26, 2003.*

* cited by examiner

*Primary Examiner* — Benny Q Tieu
*Assistant Examiner* — Martin Mushambo
(74) *Attorney, Agent, or Firm* — Cowan, Liebowitz & Latman, P.C.

(57) ABSTRACT

An object of this invention is to allow deleting/updating firmware at high speed and properly deleting/updating a software part for executing a job without posing any problem in a general job in an image processing apparatus which executes a job by combining a plurality of independent software parts. For this purpose, when updating one software part associated with an image processing job, it is determined whether a standby job as a job contains a software part to be updated. If it is determined that the standby job does not contain any software part to be updated, the software part is updated. If it is determined that the standby job contains the software part to be updated but a software part in another image processing apparatus on the network can replace the software part to be updated, software parts which execute the job are reconstructed to update the target software part. If it is determined that no alternative image processing apparatus exists, the update request is saved and held.

15 Claims, 24 Drawing Sheets

FIG. 5

| JOB TYPE | REGISTRATION NUMBER | PROCESS DATE & TIME | SOFTWARE PART | HOST | IP ADDRESS | HOST | IP ADDRESS | HOST | IP ADDRESS | HOST | IP ADDRESS |
|---|---|---|---|---|---|---|---|---|---|---|---|
| E-Mail | 00100 | 2005/9/6 10:00 | UI CONTROL | A | 174.24.11.111 | | | | | | |
| | | | TRANSMISSION APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | TRANSMISSION CONTROL | A | 174.24.11.111 | X | 174.24.11.115 | Y | 174.24.11.117 | Z | 174.24.11.119 |
| E-Mail | 00101 | 2005/9/7 13:00 | UI CONTROL | A | 174.24.11.111 | | | | | | |
| | | | TRANSMISSION APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | TRANSMISSION CONTROL | A | 174.24.11.111 | X | 174.24.11.115 | Y | 174.24.11.117 | Z | 174.24.11.119 |
| COPY | 00102 | 2005/9/8 09:00 | UI CONTROL | A | 174.24.11.111 | | | | | | |
| | | | COPYING APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | PRINTER CONTROL | A | 174.24.11.111 | M | 174.24.11.121 | N | 174.24.11.122 | | |
| ⋮ | ⋮ | ⋮ | ⋮ | ⋮ | ⋮ | ⋮ | ⋮ | ⋮ | ⋮ | ⋮ | ⋮ |

FIG. 6

| JOB TYPE | REGISTRATION NUMBER | PROCESS DATE & TIME | SOFTWARE PART | HOST | IP ADDRESS | HOST | IP ADDRESS | HOST | IP ADDRESS | HOST | IP ADDRESS |
|---|---|---|---|---|---|---|---|---|---|---|---|
| E-Mail | 00100 | 2005/9/6 10:00 | UI CONTROL | A | 174.24.11.111 | | | | | | |
| | | | TRANSMISSION APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | TRANSMISSION CONTROL | X | 174.24.11.115 | Y | 174.24.11.117 | Z | 174.24.11.119 | | |
| E-Mail | 00101 | 2005/9/7 13:00 | UI CONTROL | A | 174.24.11.111 | | | | | | |
| | | | TRANSMISSION APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | TRANSMISSION CONTROL | X | 174.24.11.115 | Y | 174.24.11.117 | Z | 174.24.11.119 | | |
| COPY | 00102 | 2005/9/8 09:00 | UI CONTROL | A | 174.24.11.111 | | | | | | |
| | | | COPYING APPLICATION | A | 174.24.11.111 | | | | | | |
| | | | SCANNER CONTROL | A | 174.24.11.111 | | | | | | |
| | | | IMAGE PROCESS | A | 174.24.11.111 | B | 174.24.11.112 | C | 174.24.11.113 | | |
| | | | PRINTER CONTROL | A | 174.24.11.111 | M | 174.24.11.121 | N | 174.24.11.122 | | |
| .. | | | .. | .. | .. | .. | .. | .. | .. | .. | .. |

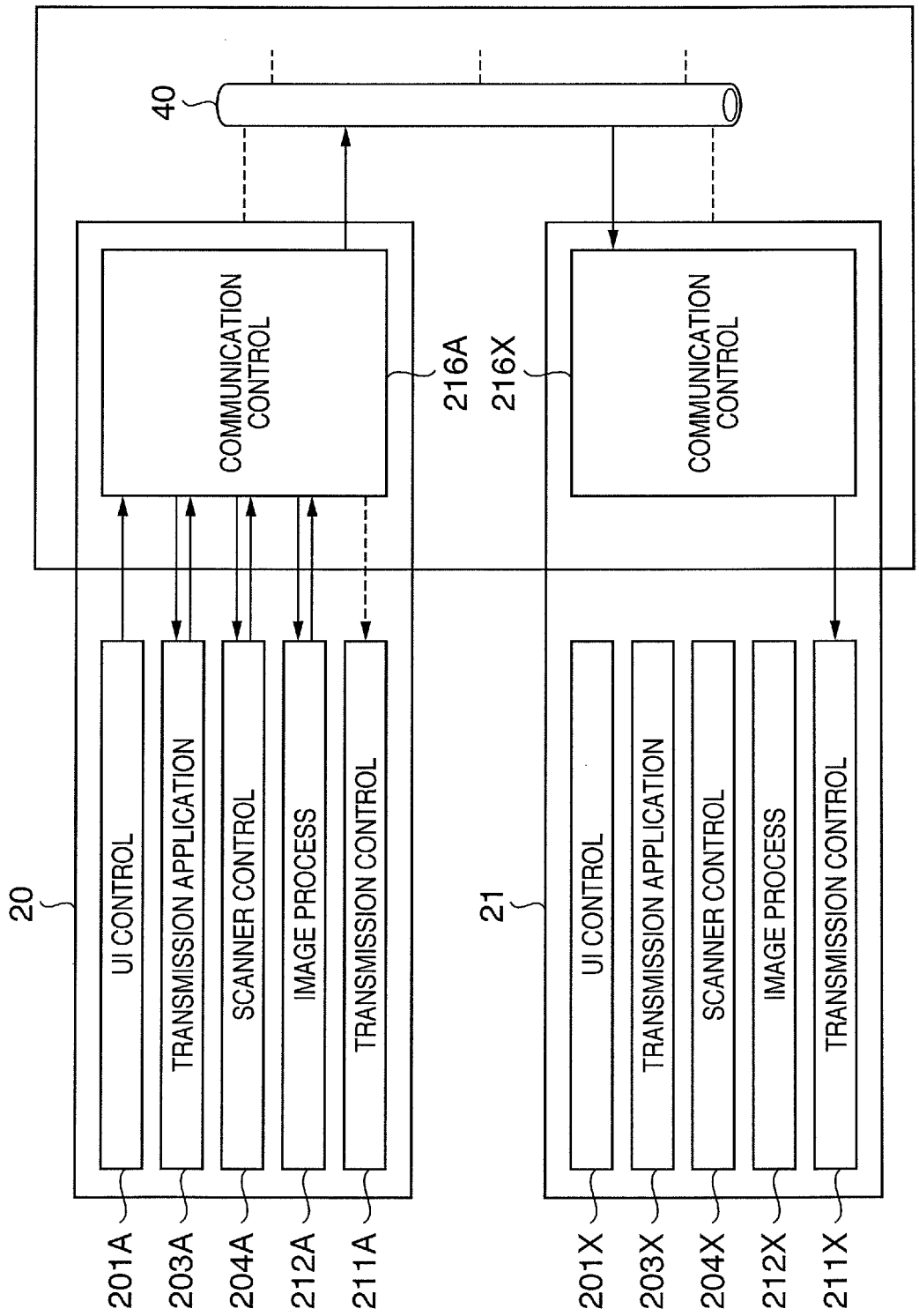

FIG. 19

| DURING EXECUTION | PDL PRINT JOB |
|---|---|
| ON STANDBY 1 | PDL PRINT JOB |
| ON STANDBY 2 | COPY JOB |
| ON STANDBY 3 | OCR JOB |
| ON STANDBY 4 | PDL PRINT JOB |
| ON STANDBY 5 | COPY JOB |
| ON STANDBY 6 | FAX TRANSMISSION JOB |
| ON STANDBY 7 | BOX PRINT JOB |

FIG. 21

| JOB TYPE | USE MODULE |
|---|---|
| PDL PRINT | NETWORK CONTROL MODULE |
| | PDL INTERPRETATION MODULE |
| | RENDERING MODULE |
| | COMPRESSION/DECOMPRESSION MODULE |
| | DOCUMENT MANAGEMENT MODULE |
| | PRINTER DEVICE CONTROL MODULE |
| COPY | UI WINDOW MODULE |
| | SCANNER DEVICE CONTROL MODULE |
| | COMPRESSION/DECOMPRESSION MODULE |
| | DOCUMENT MANAGEMENT MODULE |
| | PRINTER DEVICE CONTROL MODULE |
| FAX TRANSMISSION JOB | FAX DEVICE CONTROL MODULE |
| | SCANNER DEVICE CONTROL MODULE |
| | UI WINDOW MODULE |
| | COMPRESSION/DECOMPRESSION MODULE |
| | DOCUMENT MANAGEMENT MODULE |
| OCR JOB | UI WINDOW MODULE |
| | SCANNER DEVICE CONTROL MODULE |
| | COMPRESSION/DECOMPRESSION MODULE |
| | DOCUMENT MANAGEMENT MODULE |
| | OCR MODULE |

FIG. 23A

| EXECUTION PHASE IN PDL PRINT | USE MODULE |
|---|---|
| DURING DATA RECEPTION | NETWORK CONTROL MODULE |
| DURING PDL EXPANSION | PDL INTERPRETATION MODULE |
| | COMPRESSION/DECOMPRESSION MODULE |
| | RIP MODULE |
| | DOCUMENT MANAGEMENT MODULE |
| DURING PRINTING | COMPRESSION/DECOMPRESSION MODULE |
| | PRINTER CONTROL MODULE |
| | DOCUMENT MANAGEMENT MODULE |

FIG. 23B

| EXECUTION PHASE IN COPY JOB | USE MODULE |
|---|---|
| UI OPERATION | UI WINDOW MODULE |
| DURING SCANNING | SCANNER DEVICE CONTROL MODULE |
| | COMPRESSION/DECOMPRESSION MODULE |
| | DOCUMENT MANAGEMENT MODULE |
| DURING PRINTING | COMPRESSION/DECOMPRESSION MODULE |
| | PRINTER CONTROL MODULE |
| | DOCUMENT MANAGEMENT MODULE |

FIG. 24

| MODULE NAME | UPGRADING TIME | ESTIMATED DOWNLOAD TIME |
|---|---|---|
| SCANNER DEVICE CONTROL MODULE | 40 SEC | 25 SEC |
| FAX DEVICE CONTROL MODULE | 60 SEC | 80 SEC |
| NETWORK CONTROL MODULE | 50 SEC | 45 SEC |
| EXPANSION I/F CONTROL MODULE | 30 SEC | 25 SEC |
| USB CONTROL MODULE | 35 SEC | 30 SEC |
| UI WINDOW MODULE | 40 SEC | 20 SEC |
| PDL INTERPRETATION MODULE | 20 SEC | 60 SEC |
| RENDERING MODULE | 15 SEC | 40 SEC |
| IMAGE PROCESSING MODULE | 80 SEC | 25 SEC |
| COMPRESSION/DECOMPRESSION MODULE | 40 SEC | 45 SEC |
| DOCUMENT MANAGEMENT CONTROL MODULE | 70 SEC | 20 SEC |
| PRINTER DEVICE CONTROL MODULE | 60 SEC | 40 SEC |

JOB PROCESSING APPARATUS COORDINATING UPDATE OF SOFTWARE USED IN JOB EXECUTION AND CONTROL METHOD THEREOF

BACKGROUND OF THE INVENTION

1. Field of the Invention

The present invention relates to a software part (software component) update technique in a multifunctional image processing apparatus.

2. Description of the Related Art

As the use of networks becomes popular, various devices exist on a network. An apparatus shared between client PCs, such as an image processing apparatus (a printing apparatus or a multifunctional peripheral having a plurality of functions such as printing, FAX, scanner, and copying) generally exists on a network. Such an image processing apparatus incorporates a CPU (processor) to analyze and process jobs received from a client.

Updating a program (firmware) executed by the CPU allows for easy changing (modification) and/or addition of functions executable by the image processing apparatus within the range of hardware resources of the apparatus. In general, when receiving jobs, the image processing apparatus often queues and sequentially executes them.

When updating firmware, the image processing apparatus is disconnected from the network so as not to receive any new job during the update.

As a related art, there has been proposed a technique of optimizing rewrite of firmware and execution of a print job (e.g., Japanese Patent Laid-Open No. 2003-054087). According to this technique, when the image processing apparatus is to simultaneously perform a print job and update its firmware, it transfers the print job to another image processing apparatus and updates its firmware after transfer.

Conventionally, the image processing apparatus may not update software while a job is registered, and may not execute the job by itself.

A type of job known as a "timer job" is one which designates an execution time for a job, unlike a job whose process is executed at job input time. However, a problem may occur when the job queue (job execution queue) does not properly register jobs after software is updated or deleted. For example, when a timer job is actually registered, and the job execution queue registers the timer job in order to execute it later, a problem may occur because the software which is maintaining registration of the timer job is changed or deleted.

Updating firmware by conventional techniques assumes no job registration in the image processing apparatus. Thus, a demand is created for updating software even when a registered job exists.

SUMMARY OF THE INVENTION

The present invention has been made to overcome the conventional drawbacks, and has as its object to provide a technique capable of updating software even while registering a job.

It is another object of the present invention to provide a technique capable of changing software in consideration of a timer job registered in an image processing apparatus.

In order to solve the above problems, for example, an image processing apparatus according to the present invention comprises the following arrangement.

That is, an image processing apparatus which a has rewritable storage/holding unit for storing independently executable software parts and executes jobs of many types by combining the software parts comprises a registration unit for registering a job, a software part list storage unit for storing information for specifying a software part for use depending on a type of job registered by the registration unit, and a determination unit for, when issuing a request to change a desired software part, determining, by referring to the software part list storage unit, whether the job registered by the registration unit uses the software part to be changed.

The invention can change software in consideration of a timer job registered in an image processing apparatus.

Another invention can update software even while registering a job.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing an example of a timer job list in the first embodiment;

FIG. 6 is a table showing an example of a reconstructed timer job list in the first embodiment;

FIG. 7 is a block diagram showing the process procedures of a distributed system in the first embodiment;

FIG. 19 is a table showing an example of a job list held in the image forming apparatus in the second embodiment;

FIG. 21 is a table showing a use software module list table in the second embodiment;

FIGS. 23A and 23B are tables showing software module list tables used for respective sequences in a job in the second embodiment; and FIG. 24 is a table showing a list of the update time and download time of each software module in the second embodiment.

DESCRIPTION OF THE EMBODIMENTS

Preferred embodiments of the present invention will be described in detail below with reference to the accompanying drawings.

First Embodiment

The first embodiment will be described.

An example of a system configuration on a network according to the first embodiment will be explained with reference to FIG. 1.

General-purpose information processing apparatuses (to be referred to as PCs hereinafter) 10 and 11 such as personal computers, and image forming apparatuses 20, 21, 22, and 23 such as a copying machine and printer exist on a local area network (LAN) 40. The network is not limited to the LAN and may be the Internet. FIG. 1 shows an example of connecting two PCs and four image forming apparatuses. However, the numbers of PCs and image forming apparatuses are not limited, and connection nodes may contain devices other than PCs and image forming apparatuses.

Figure 2:
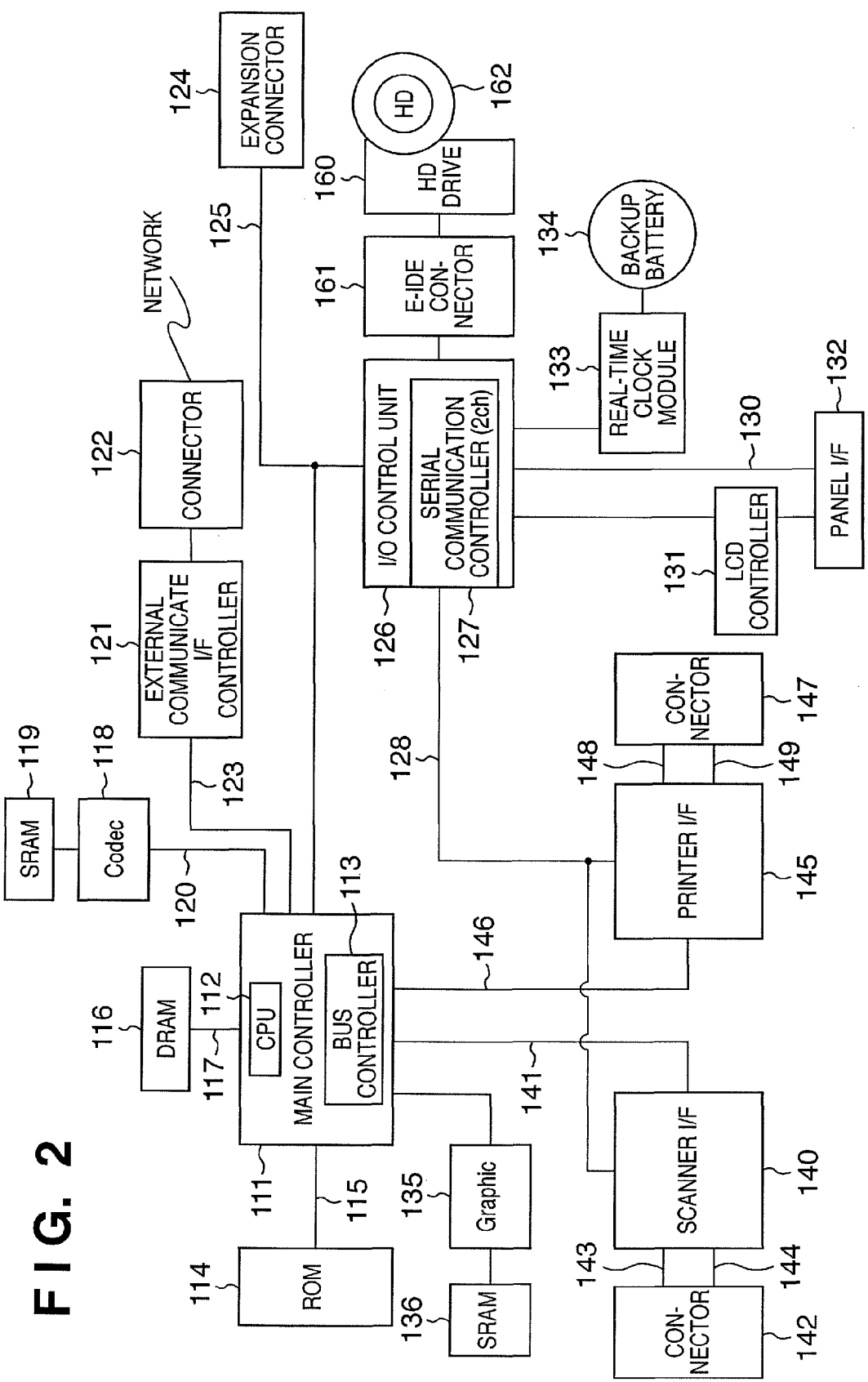
FIG. 2 is a block diagram of an image forming apparatus in the first embodiment.

An example of the controller blocks of the image forming apparatuses (MFPs) 20, 21, 22, and 23 will be described with reference to FIG. 2.

A main controller 111 mainly comprises a CPU 112, bus controller 113, and various I/F controller circuits. The CPU 112 and bus controller 113 control the whole operation of the control unit 110. The CPU 112 runs on the basis of a boot program loaded from a ROM 114 via a ROM I/F 115 in booting.

The bus controller 113 controls transfer of data input/output from/to each I/F, and performs arbitration upon bus contention and control of DMA data transfer. A DRAM 116 connects to the main controller 111 via a DRAM I/F 117. The DRAM 116 is used to load a program to be processed by the CPU 112, and used as the work area of the CPU 112 and an area for accumulating image data. A Codec 118 compresses raster image data accumulated in the DRAM 116 by a format such as MH/MR/MMR/JBIG/JPEG, and decompresses (decodes) compressed/accumulated code data into raster image data. An SRAM 119 serves as a temporary work area for the Codec 118. The Codec 118 connects to the main controller 111 via an I/F 120, and the bus controller 113 controls data transfer between the Codec 118 and the DRAM 116 to DMA-transfer the data.

A graphic processor 135 performs processes such as image rotation and scaling. An external communicate I/F 121 connects to the main controller 111 via an I/F 123, and connects to the network 40 and a public line via a connector 122. A general high-speed bus 125 connects an I/O control unit 126 and an expansion connector 124 for connecting an expansion board. The general high-speed bus is generally a PCI bus. The I/O control unit 126 comprises asynchronous serial communication controllers 127 of two channels that transmit/receive control commands to/from the CPUs of a reader and printer (neither is shown). The I/O control unit 126 connects to external I/F circuit 140 and 145 via an I/O bus 128. A panel I/F 132 connects to an LCD controller 131, and comprises an I/F for display on the liquid crystal screen of an operation unit 150 (not shown). The panel I/F 132 has a key input I/F 130 for receiving inputs from hard keys and touch panel keys. A real-time clock module 133 updates and saves a date and time managed in the apparatus, and is backed up by a backup battery 134.

An E-IDE connector 161 connects an external storage device. In the first embodiment, the I/F connects a hard disk drive 160 to store image data in a hard disk 162 and read out image data from the hard disk 162. The hard disk 162 saves an OS and various software codes according to the first embodiment, and is used to, for example, update the software codes.

The software codes are divided into several software parts, and each software part is updatable or deletable. In updating a software part, the hard disk ensures a temporary area where a new software part to be updated is temporarily saved. Then, the software part stored in a formal save area is updated. In update, the software part is backed up in a backup area ensured in the same hard disk, and then actually updated.

Connectors 142 and 147 connect to the reader and printer (neither is shown), respectively, and comprise asynchronous serial I/Fs 143 and 148 and video I/Fs 144 and 149. The scanner I/F 140 connects to the reader via the connector 142 and to the main controller 111 via a scanner bus 141. The scanner I/F 140 has a function of performing a predetermined process for an image received from the reader. The scanner I/F 140 also has a function of outputting to the scanner bus 141 a control signal generated on the basis of a video control signal sent from the reader. The bus controller 113 controls data transfer from the scanner bus 141 to the DRAM 116.

The printer I/F 145 connects to the printer (printer engine) via the connector 147. The printer I/F 145 connects to the main controller 111 via a printer bus 146. The printer I/F 145 has a function of performing a predetermined process for image data output from the main controller 111 and outputting the processed data to the printer. The printer I/F 145 also has a function of outputting to the printer bus 146 a control signal generated on the basis of a video control signal sent from the printer. The bus controller 113 controls transfer of raster image data expanded in the DRAM 116 to the printer, and DMA-transfers the raster image data to the printer via the printer bus 146 and video I/F 149.

In the above arrangement, after turning on the image forming apparatus 20 in the first embodiment, the CPU 112 initializes the overall apparatus in accordance with a boot program in the ROM 114. The CPU 112 controls the hard disk drive 160 to load an OS (multitask OS) stored in the hard disk 162 into the DRAM 116. If necessary, the CPU 112 loads various program parts similarly from the hard disk 162 into the DRAM 116 and executes them, and the image forming apparatus 20 functions as a multifunctional peripheral (MFP).

Various program parts run as independently executed threads, and include various parts. The image forming apparatus in the first embodiment has a scanner function, printer function, copying function, facsimile function, and E-Mail function. By giving attention to the scanner function (function to scan a document), the image forming apparatus has UI control to perform various setting operations for scanning a document, and scanner control to scan a document in accordance with actually set parameters. The scanner function also includes an image process to perform various correction processes for a scanned document image, and a process to transmit data to a transmission destination (PC such as a file server). These processes are executed as program parts in cooperation with each other. With this configuration, for example, common scanner control for scanning a document becomes available for the copying function. This configuration can facilitate the development and management of the program of the apparatus, and can also facilitate a change such as update or deletion of each program part. Even the printer function (network printer function) and copying function sometimes print finally using the printer engine. It will be understood that program parts concerning printer engine control are commonly available.

Figure 3:
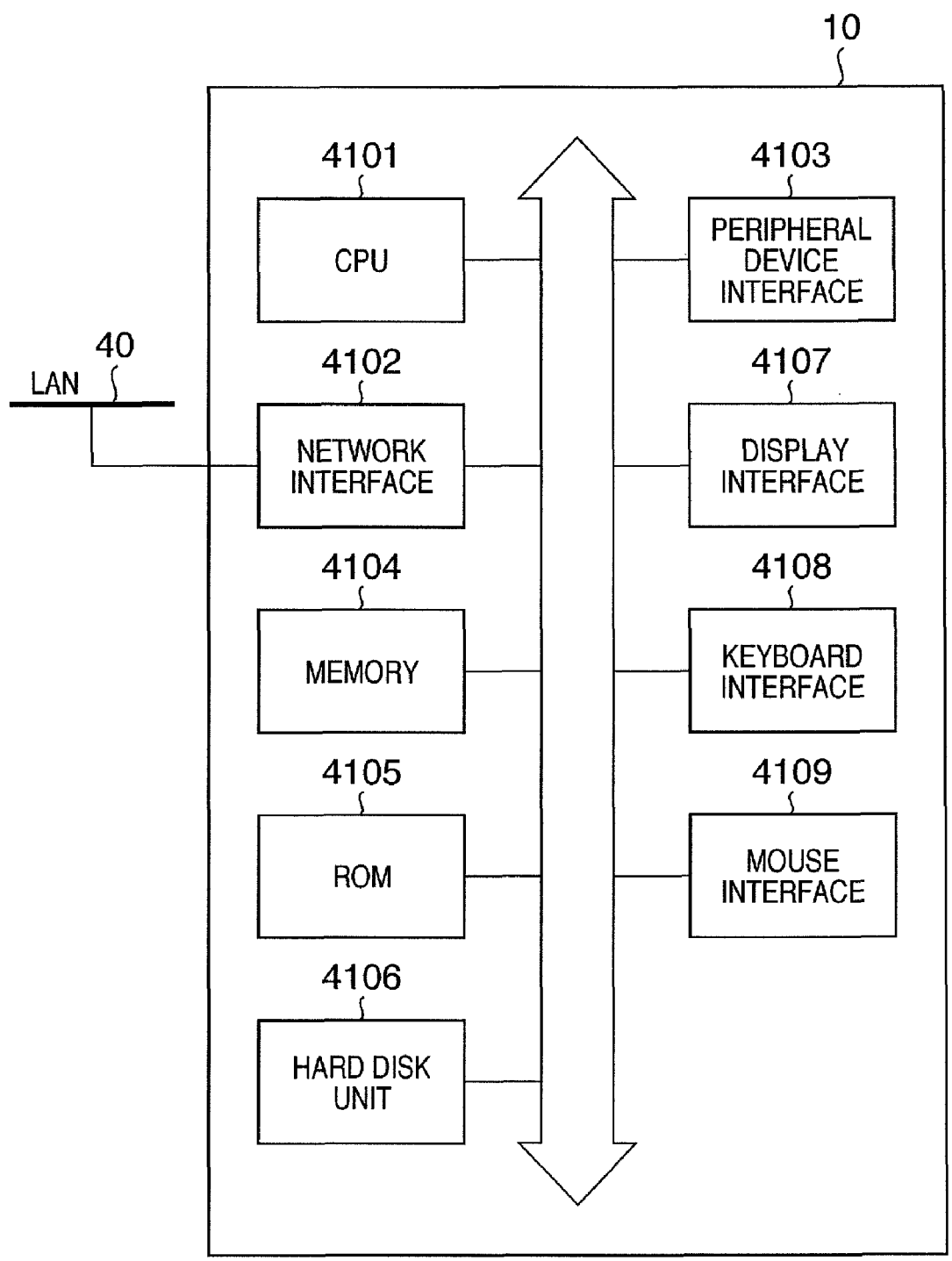
FIG. 3 is a block diagram of a PC in the first embodiment.

An example of the internal arrangement of the PC 10 (or PC 11) in FIG. 1 will be explained with reference to FIG. 3.

A CPU 4101 is a central processing unit which performs overall control. Upon power-on, the CPU 4101 starts up in accordance with a boot program stored in a ROM 4105 to initialize the whole apparatus. The CPU 4101 loads an OS stored in a hard disk unit 4106 into a memory 4104 (RAM) to activate the OS. After that, the CPU 4101 loads a desired application program stored in the hard disk unit 4106 into the memory 4104 and performs document editing or the like in accordance with a user instruction.

A network interface 4102 is a controller for communicating data with another device via the network 40. Software executed by the CPU 4101 can bidirectionally exchange data with a printing device, another network device, or another computer. A peripheral device interface 4103 is a controller for controlling a peripheral device.

As described above, the hard disk unit 4106 stores an OS, various application programs, printer drivers, and data files created by applications.

A display interface 4107 is a controller for connecting a display unit for displaying the internal state of a PC, an execution state, and the like. A keyboard interface 4108 and mouse interface 4109 allow connecting input devices for inputting data and instructions by a user. The peripheral device interface 4103 is a controller for connecting peripheral devices complying with specifications such as USB, RS-232C serial, and IEEE1394 interfaces.

Figure 4:
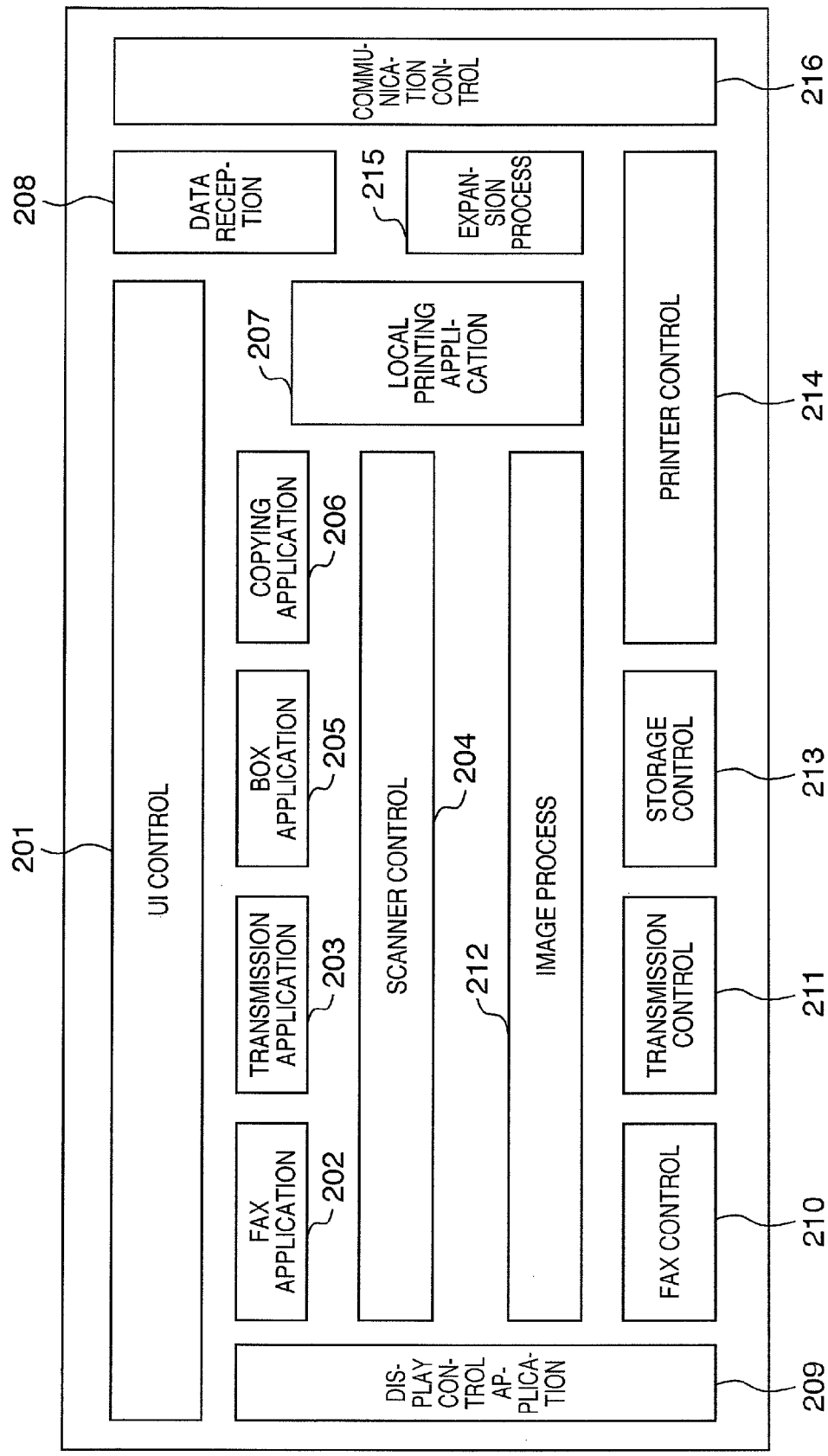
FIG. 4 is a block diagram of software parts of the image forming apparatus in the first embodiment.

FIG. 4 is a block diagram for explaining an example of software parts (modules) of the image forming apparatus 20 (or another apparatus) in the first embodiment. As described above, the hard disk 162 stores the software pars in the initial state. When the apparatus functions as a multifunctional peripheral, the software parts are loaded into the DRAM 116 and executed by the CPU 112.

In FIG. 4, reference numeral 201 denotes a UI control module which accepts a user operation from the operation panel of the image forming apparatus, transfers information to a lower application layer, and determines a bitmap image to be displayed on the operation panel. Reference numeral 202 denotes a FAX application which handles the address book and issues a FAX transmission instruction in accordance with an instruction from the UI control module. Reference numeral 203 denotes a transmission application which handles the address book, performs control corresponding to the protocol type such as E-Mail transmission or FTP transmission, and issues a transmission process instruction in accordance with an instruction from the UI control module.

Reference numeral 205 denotes a box application which issues an instruction to store data in a box area ensured in a storage device (hard disk 162 in the first embodiment), and executes an operation such as movement or copying of a document. Reference numeral 206 denotes a copying application which designates a so-called copying operation. Reference numeral 204 denotes a scanner control module which controls a scanner device. Reference numeral 212 denotes an image processing module which performs an image process such as rotation or enlargement/reduction of a scanned image. Reference numeral 207 denotes a local printing application which designates printing of a document saved in the storage or printing of a log report. Reference numeral 208 denotes a data reception module which receives, e.g., external PDL data. Reference numeral 215 denotes an expansion processing module which expands PDL data into a raster image. Reference numeral 210 denotes a FAX control module which controls a FAX device. Reference numeral 211 denotes a transmission control module which performs a protocol process such as an E-Mail process. Reference numeral 213 denotes a storage control module which controls a storage device such as a hard disk ensuring a storage area. Reference numeral 214 denotes a printer control module which controls a printer device. Reference numeral 209 denotes a display control application which arranges information for transferring a device status such as a PDL reception status to the UI control module. Reference numeral 216 denotes a communication control module which plays a role of controlling communication between software parts. The communication mechanism will be described in detail with reference to FIG. 7.

As described above, various independent software parts are prepared in the image forming apparatus in the first embodiment, and cooperate with each other to achieve one job process. The software parts communicate with each other via IP addresses and ports (or arguments). An IP address is the same for a process in one image forming apparatus and seems unnecessary. In the first embodiment, however, a plurality of image forming apparatuses connect to the network 40, and share their resources (hardware resources such as a scanner and printer engine, and software resources for various processes). Thus, software parts communicate with each other using IP addresses. Software parts suffice to communicate with each other via the network, and may communicate with each other using unique names on the network instead of IP addresses.

For example, a case will be examined where image forming apparatus A executes a copying function, i.e., makes various settings (e.g., the number of copies, and whether or not to staple sheets) associated with scanning and copying of a document, and scans and prints a document. In this case, executed software parts require the UI control module 201 of the operation panel, the copying application 206, the scanner control application 204, the image processing application 212, the printer control application 214, and the communication control application 216 which controls cooperation between them. If image forming apparatus A cannot execute the printer control application 214 because of any reason, it can also utilize the printer control application 214 of another image forming apparatus B. The reason why image forming apparatus A cannot execute the printer control application 214 is, for example, that the printer control application was deleted or that the user intentionally designates image forming apparatus B as a printout destination.

As described above, a software part of image forming apparatus B replaces a software part inexecutable by image forming apparatus A. For this purpose, image forming apparatus A must detect that image forming apparatus B exists on the network 40 and detect software parts of image forming apparatus B. This can be implemented by a technique such as UPnP or its advanced technique.

A timer job in the first embodiment will be described. The purpose of the timer job is to execute a process at a date timing designated by a user. This timing is determined by a date and time (including a minute and second) designated by a user, or by the lapse of a designated time.

For example, the user may designate a printout time when activating an application for document editing or the like and designating printing. This situation will easily occur considering a case where the user knows in advance that a meeting is to be held at a designated time and designates printout of meeting materials in advance before the meeting. The timer job can also cope with a case of, for example, attaching a scanned document image to E-Mail and transmitting it at a designated timing.

Upon generating a timer job, as described above, information on the timer job is added and stored in a timer job list ensured in advance in the hard disk 162 to manage the time of the timer job. At the designated time, various associated software parts execute unprocessed parts of the job. At this time, the software part list used for the timer job is also stored in the first embodiment in order to efficiently delete and update various software parts even after managing the software parts as the timer job in the first embodiment. Note that software parts are deleted and updated by activating the firmware (software part) update application of the image forming apparatus by the PC 10 or the like via the network 40. More specifically, the PC 10 or the like activates the update application, designates the IP address of an image forming apparatus on the network, and issues a deletion/update command. In update, the PC 10 or the like subsequently transmits software part information to be updated to the designated IP address (image forming apparatus) together with identification information of the software part. The expansion connector 124 of the image forming apparatus may connect to a drive for accessing a storage medium such as a flexible disk or memory card. In this apparatus, a storage medium storing change request information may be set in the drive to update a software part in accordance with an instruction from the operation panel.

Figure 1:
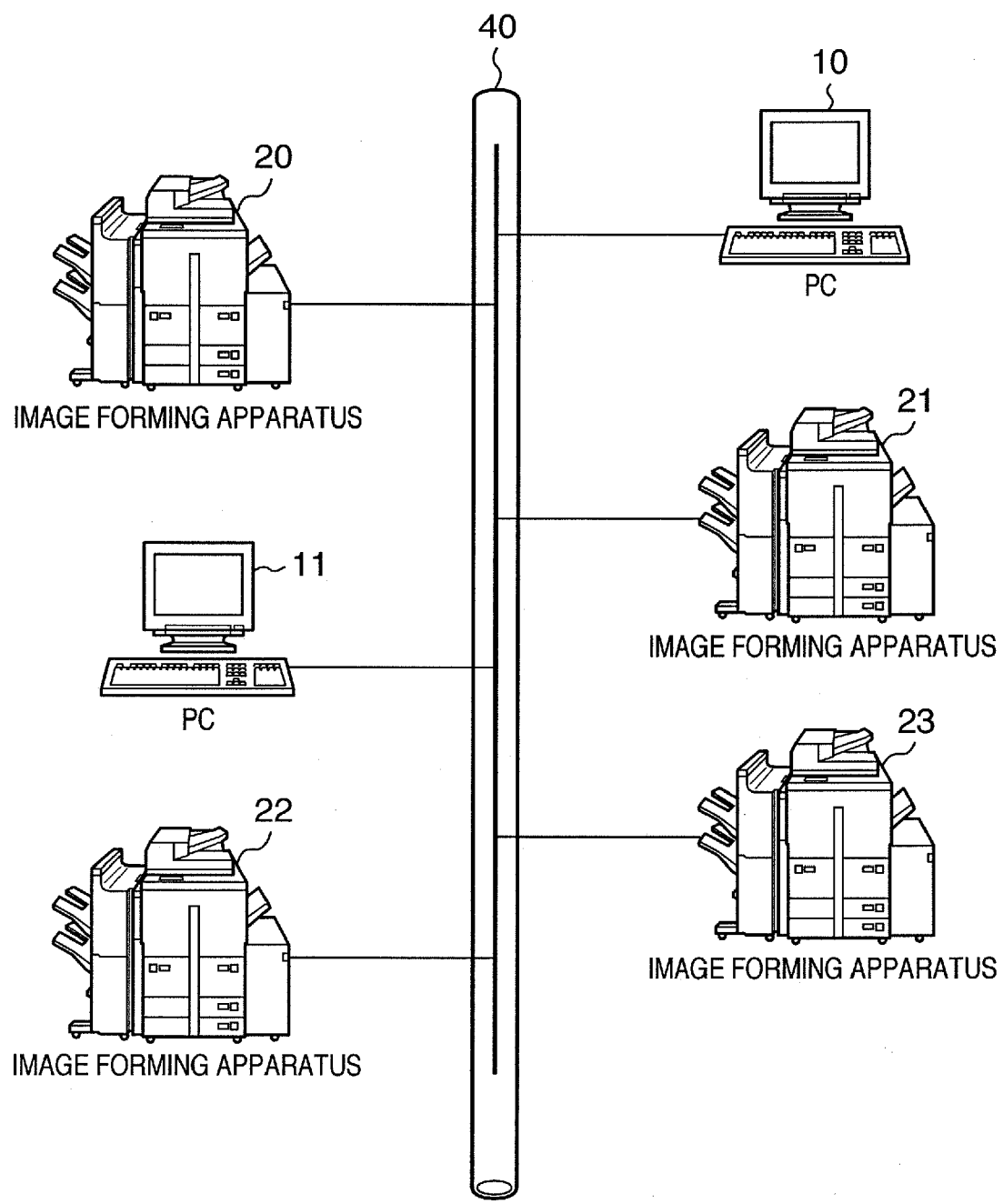
FIG. 1 is a view of a system configuration in the first embodiment.

FIG. 5 shows an example of a timer job list stored in the hard disk 162 of image forming apparatus A (one of the image forming apparatuses 20 to 23 in FIG. 1).

For a registered timer job, the timer job list manages the type of job, a registration number for managing the queue of the timer job, and the start timing of the timer job. As shown in FIG. 5, the timer job list also manages a software part assigned to use a timer job, the host name of the software part, the location (IP address) of the host, another available software part, its host name, and the location (IP address) of the host.

Details of a timer job registration process will be described later. When registering a timer job, a registration number is issued to uniquely manage each timer job. A software part used for the job is extracted, and the IP address of an image forming apparatus incorporating the software part is stored. As an IP address to be registered, the IP address of an image forming apparatus which receives the job is preferential.

FIG. 5 shows an example in which registered timer jobs are two E-Mail (electronic mail) transmission jobs and one copy job.

As for the first E-Mail transmission job, the timer job list represents that the registration number is 00100, and the process time (after the date and time when a timer job occurs) is 2005/9/6 10:00. Further, the timer job list represents that software parts for use are the UI control module, transmission application, scanner control module, image processing module, and transmission control module. The top priority host is A (local) for all the modules, and its IP address is 172.24.11.111. The timer job list also registers, as the second and subsequent available software parts, a software part of the image processing module having a host name "B" and an IP address of 172.24.11.112, and a software part of the image processing module having a host name "C" and an IP address of 172.24.11.113.

The timer job list also registers a software part of the transmission control module having a host name "X" and an IP address of 172.24.11.115, a software part of the transmission control module having a host name "Y" and an IP address of 172.24.11.116, and a software part of the transmission control module having a host name "Z" and an IP address of 172.24.11.117.

As for the second E-Mail transmission job and one copy job, the timer job list registers pieces of information as shown in FIG. 5.

A case of issuing a request to delete/update a software part in image forming apparatus A while managing the timer job list will be described. In this case, deletion of the transmission control module in an E-Mail job is requested.

After deleting the transmission control module from image forming apparatus A, the CPU 112 of image forming apparatus A refers to the timer job list to determine whether an alternative host (image forming apparatus other than image forming apparatus A) of the transmission control module exists. If the CPU 112 confirms the presence of an alternative host, it deletes the host name "A" for executing the transmission control module and the IP address of the host from the timer job list, and moves up the host names and IP addresses of the second and subsequent hosts.

If no alternative host exists, the CPU 112 temporarily holds deletion of the transmission control module in an E-Mail job. The holding state continues until an unprocessed E-Mail job exists in the timer job list. In other words, the CPU 112 deletes the requested transmission control module when timer jobs are sequentially performed and no unprocessed E-Mail job exists.

Even upon issuing a software part deletion request, a state in which a job using the software part is executable can be maintained, as described above.

FIG. 6 shows the structure of a timer job list when an alternative host exists. As shown in FIG. 6, a host name "A" of a host which executes the transmission control module in an E-Mail job is deleted, and an alternative host name "X" and the IP address of the host are moved up.

An example of a process by the communication control module 216 shown in FIG. 4 which controls communication between software parts will be explained with reference to FIG. 7.

The communication control module implements the concept of a distributed object.

Software parts except for the communication control module can communicate with any partner module which receives a process result from the software parts.

For an E-Mail job, a UI control module 201A transfers an instruction to a communication control module 216A. In response to this, the communication control module instructs a transmission application 203A to transmit E-Mail. In other words, the job is achieved by transmitting pieces of information received from software parts to lower software parts in accordance with an order determined for each job type.

For an E-Mail timer job in the state of FIG. 5 in which no software part is deleted, the communication control module 216A activates the UI control module 201A and prompts a user to select a process item. In the description of an example of the E-Mail job, the user selects an E-Mail timer job. When determining that the user designates an E-Mail timer job, the communication control module 216A activates the E-Mail transmission application 203A and prompts the user to input document scan settings, a destination mail address, and transmission timing. The communication control module 216A acquires these pieces of information. Among them, the communication control module 216A transfers, to a scanner control module 204A, document scanning information and information which instructs the hard disk 162 serving an output destination on a file name in scanning. The communication control module 216A causes the scanner control module 204A to start scanning a document.

As a result, the hard disk 162 stores an E-Mail transmission image data file. After that, the communication control module 216A waits till the timing designated by a timer job in FIG. 7. If the communication control module 216A determines that the time has reached the designated date and time, it activates an image processing module 212A so as to perform a predetermined image process for image data stored in the hard disk 162. The communication control module 216A transfers image data as a result of the image process and a destination mail address to an activated transmission control module 211A, and causes it to transmit E-Mail.

A case of deleting the transmission control module 211A of host A, as shown in FIG. 6, will be examined. In this case, the transmission control module 211A of host A is not available (represented by a broken line in FIG. 7). Hence, the communication control module 216A transmits image data generated by the image processing module to a transmission control module 211X of the image forming apparatus 21 serving as host X (IP address is 174.24.11.115). The subsequent process is the same as that described above except that host X performs an E-Mail transmission process, and a description thereof will be omitted.

Figure 8:
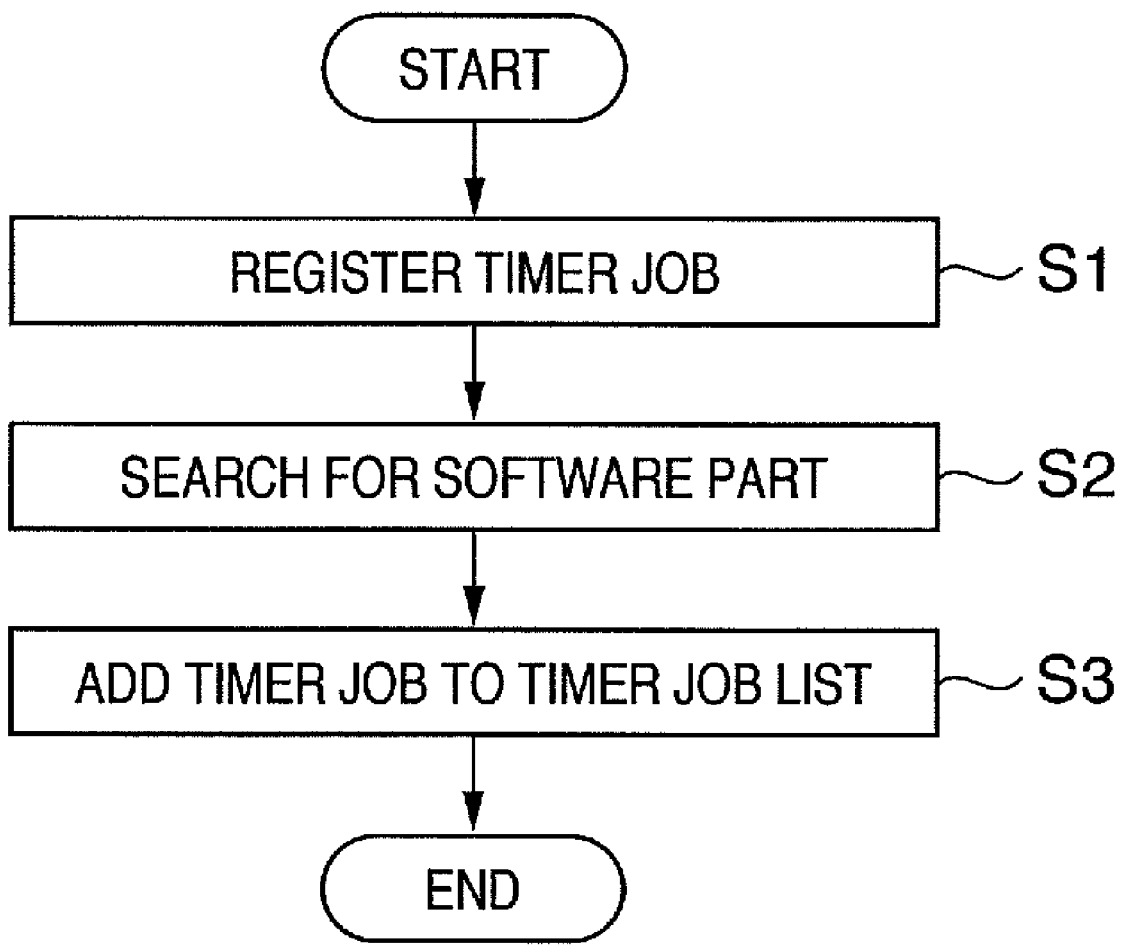
FIG. 8 is a flowchart showing timer job registration process procedures by the image forming apparatus in the first embodiment.

A timer job registration process in the first embodiment will be described in accordance with the flowchart of FIG. 8.

In step S1, a timer job is registered. The timer job includes a timer E-Mail job and timer copy job, as described above, and also includes a timer print job from the PC 10 or the like. The timer E-Mail job and timer copy job execute scanning of a document and registration of image data in the hard disk 162 under the UI control, and hold subsequent processes till timings set by the timer.

In step S2, software parts necessary for the registered timer job are searched for. At this time, the host image forming apparatus and another image forming apparatus on the network 40 are searched for software parts used to execute the timer job. Upon search of the host image forming apparatus, it is checked whether necessary software parts exist in software parts stored in the hard disk 162 of the apparatus. To check whether necessary software parts exist in another image forming apparatus, the host image forming apparatus sends an identifier capable of specifying the type of necessary software parts and a search request to another image forming apparatus. Another image forming apparatus is not limited to an image forming apparatus as far as necessary software parts exist in the apparatus.

Then, the process advances to step S3 to issue the registration number of the timer job, additionally register the timer job in the timer job list (see FIGS. 5 and 6), and store and manage it till the timing designated by the user.

Figure 9:
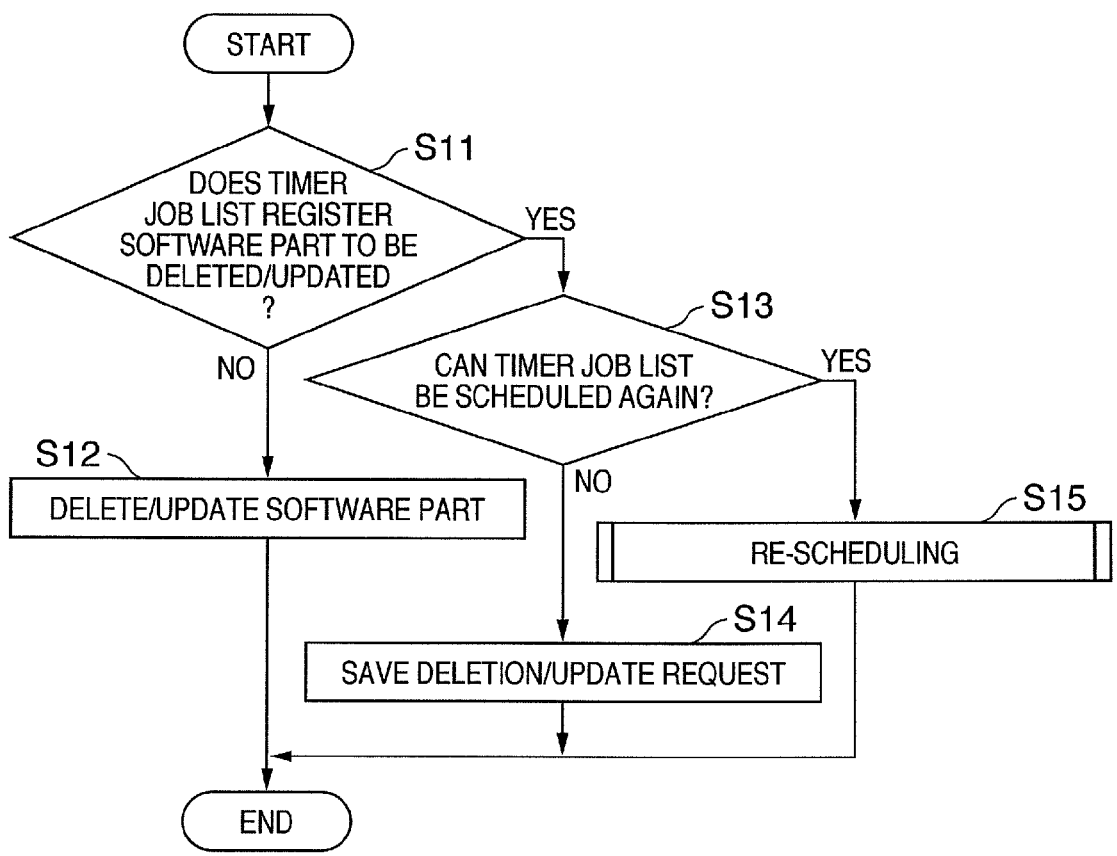
FIG. 9 is a flowchart showing process procedures when issuing a software part deletion/update request in the first embodiment.

A process when issuing a software part change request (deletion/update request) will be described with reference to the flowchart of FIG. 9. The user inputs a software part change request via, e.g., the operation unit of the image processing apparatus. The user may input a software change request from an external management server, which will be described in S1701 in the second embodiment. An actual image forming apparatus is assumed to register, in the job queue, an executable job which is executed in real time. A job registered in the job queue will be described in detail in the second embodiment with reference to FIG. 17. The following description assumes a case capable of changing a software part in accordance with a job registered in the job queue without any problem.

In step S11, it is determined whether the timer job list registers a software part to be deleted/updated. If the timer job list does not register the software part to be deleted/updated, the software part to be deleted/updated is irrelevant to the timer job, and the process advances to step S12 to delete/update the software part.

If the software part to be deleted/updated exists in the timer job list, the process advances to step S13 to determine whether the timer job list can be scheduled again. A re-scheduling process will be explained in detail with reference to FIG. 10.

For example, when the timer job list is in the state of FIG. 5, a request to delete or update the "transmission control module" is issued. Even if the "transmission control module" of host A is deleted, it can be replaced with an identical module of host X. In this case, it is determined that re-scheduling is possible. If no alternative host exists (or only one image forming apparatus exists on the network), it is determined that re-scheduling is impossible.

If it is determined in step S13 that no timer job list can be scheduled again, the process advances to step S14. In this case, the request information (including an updated software part for an update request) is temporarily saved in a predetermined folder of the hard disk. In other words, no deletion/update process is executed in real time. A held/unexecuted change (deletion/update) of a software part is executed by the flowchart of FIG. 11 to be described in detail later.

If it is determined in step S13 that the timer job list can be scheduled again, the process advances to step S15 to schedule the timer job list again.

Figure 10:
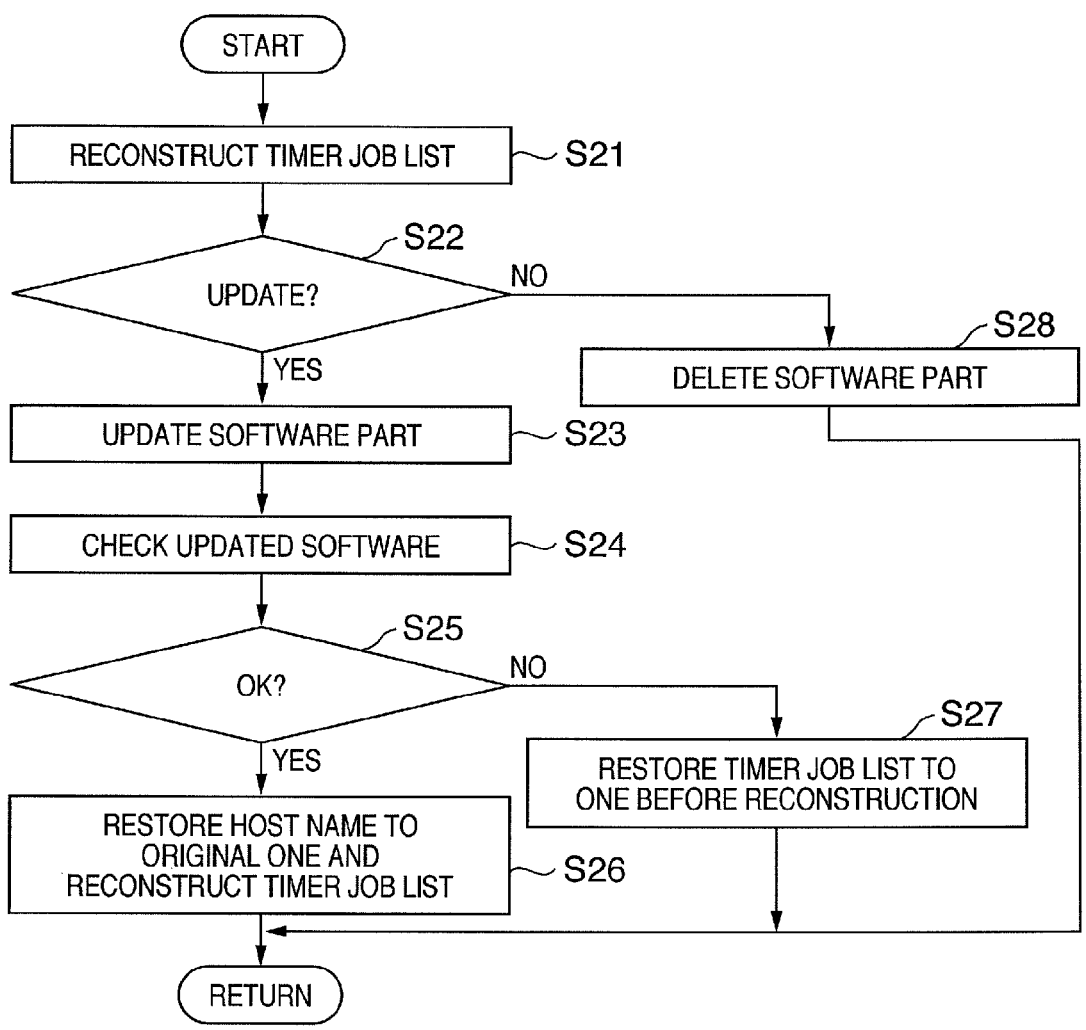
FIG. 10 is a flowchart showing details of step S15 in FIG. 9.

The re-scheduling process in step S15 will be explained with reference to the flowchart of FIG. 10.

In step S21, a software part to be deleted/updated in the timer job list is used to execute a timer job, and then excluded from process targets. Instead, a software part of another host is assigned to reconstruct the timer job list. For example, to delete/update the "transmission control module", the timer job list is reconstructed from the state of FIG. 5 to that of FIG. 6.

The process advances to step S22 to determine whether the generated change request is an update or deletion request. If it is determined that the generated change request is an update request, the process advances to step S23. If an old software part resides in the DRAM 116, the old software part is deleted and the old software part in the hard disk 162 is moved to a preset save folder. To execute the updated software part, it is stored in the hard disk 162.

The process advances to step S24 to check the operation of the updated software part. The operation is checked by transferring data determined in advance by the specification of the software part to the software part and determining whether the result is correct (expected result). The image forming apparatus stores the data input to the software part.

In step S25, it is determined whether the updated software part performed a correct process. If it is determined that the updated software part performed a correct process, the process advances to step S26 to reconstruct (recover) the timer job list so as to utilize the updated software part stored in the image forming apparatus. For example, the timer job list returns from the state of FIG. 6 to that of FIG. 5. In other words, the host name "A" of the host which executes the transmission control module is assigned again to the E-Mail job. The updated transmission control module is assigned as the reconstructed transmission control module.

If the updated software part does not return a correct process result, the process advances to step S27 to restore the timer job list reconstructed in step S21 to the original one. The old software part saved in the preset save folder returns to the original location so as to utilize it in executing the timer job.

If it is determined in step S22 that the generated request is a deletion request, the process advances to step S28. At this time, the requested software part is deleted. As a result, the software part disappears, but an alternative host exists, and the timer job is free from any problem.

Figure 11:
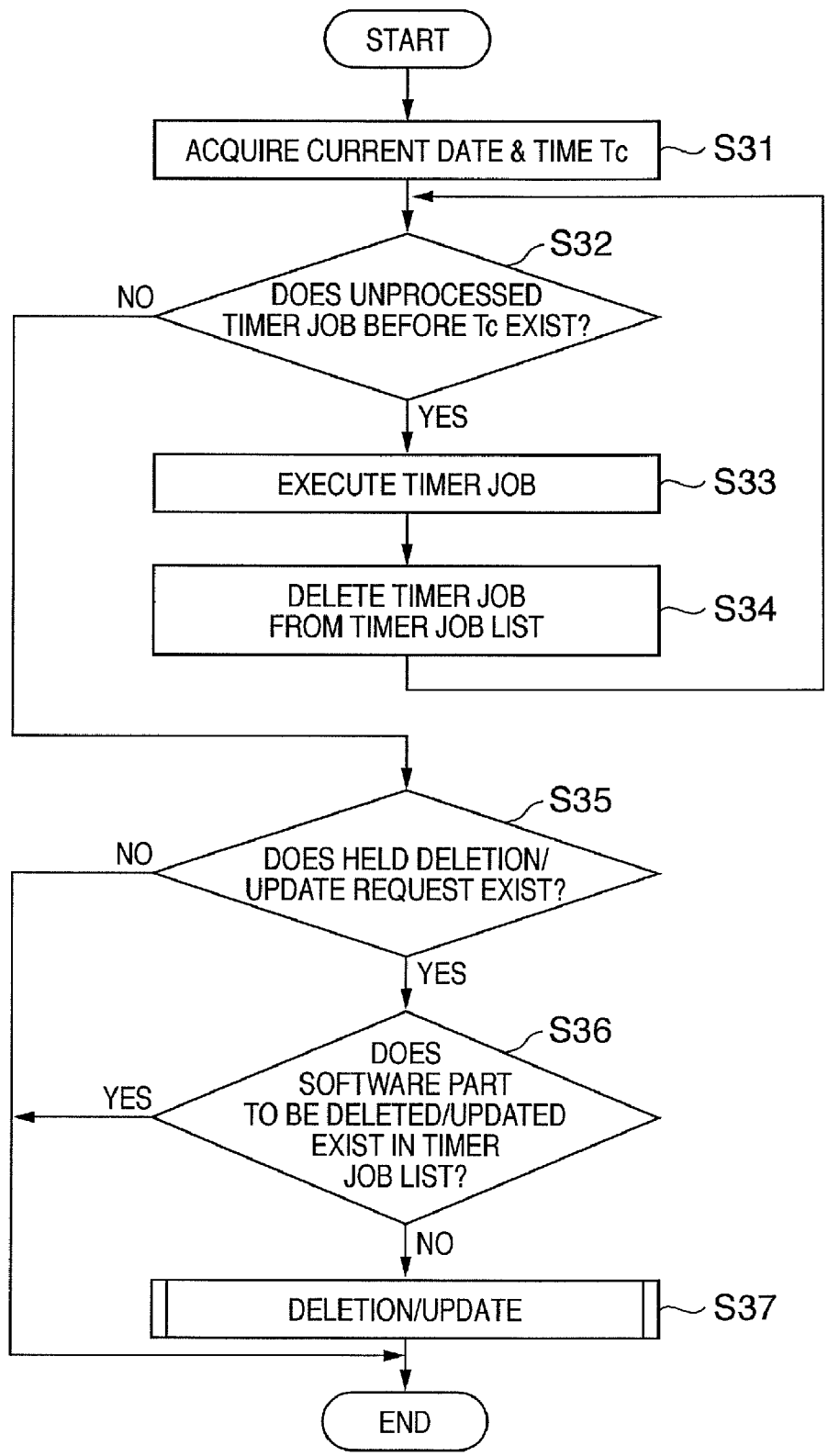
FIG. 11 is a flowchart showing timer job process procedures in the first embodiment.

A timer job process in the first embodiment will be described with reference to the flowchart of FIG. 11.

The CPU 112 executes the timer job process upon reception of, e.g., an interrupt signal every minute from the real-time clock module 133.

In step S31, the CPU 112 acquires the current timing information (date & time) Tc from the real-time clock module.

The process advances to step S32 to search the timer job list and determine whether a timer job to be processed exists. More specifically, at the setting time Ti (i=1, 2, . . . ) of each timer job, the CPU 112 determines whether there is a timer job to be processed which meets the relation: Ti≦Tc. Not the relation of Ti=Tc but the relation of Ti to ≦Tc is set because the interrupt process every minute in the first embodiment has an error of 1 min at maximum. The relation is not limited to this in executing an interrupt process every 30 sec.

If the CPU 112 determines that there is a timer job to be processed, the process advances to step S33 to sequentially execute software parts represented by the host name and process the timer job. Upon the completion of processing the timer job, the process advances to step S34 to delete the timer job from the timer job list because the timer job need not be managed. Steps S33 and S34 are repeated as far as a timer job to be processed remains.

If no timer job to be processed remains at the current time, the process advances to step S35. In step S35, the CPU 112 determines whether the hard disk 162 stores deletion/update request information. That is, the CPU 112 determines whether the process in step S14 of FIG. 9 was executed.

If the CPU 112 determines that the hard disk 162 does not store deletion/update request information, the current timer job list does not change, and the process ends.

If the CPU 112 determines that the hard disk 162 stores deletion/update request information, the process advances to step S36 to determine whether the timer job list registers a software part to be deleted/updated. If the timer job list does not register any software part to be deleted/updated, the deletion/update process targets a software part irrelevant to the timer job. Thus, the process advances to step S37 to delete/update the software part, and then ends. If the CPU 112 determines in step S36 that the timer job list registers a software part to be deleted/updated, the process ends without deleting/updating the software part.

As described above, the first embodiment facilitates the development of respective software parts by combining independent software parts to implement various types of functions. Upon issuing a deletion/update request to a desired software part, the requested process is done in real time for a software part irrespective of an uncompleted timer job. To the contrary, upon issuing a deletion/update request to a software part which forms an uncompleted timer job, the software part is deleted/updated as requested while keeping at least the registered timer job executable as far as an alternative host of the software part exists. If no alternative host of the software part to be deleted/updated exists, the software part is deleted/updated only after the completion of the timer job. Also in this case, the first embodiment promises a normal operation of the timer job.

Second Embodiment

The second embodiment will be described.

Figure 12:
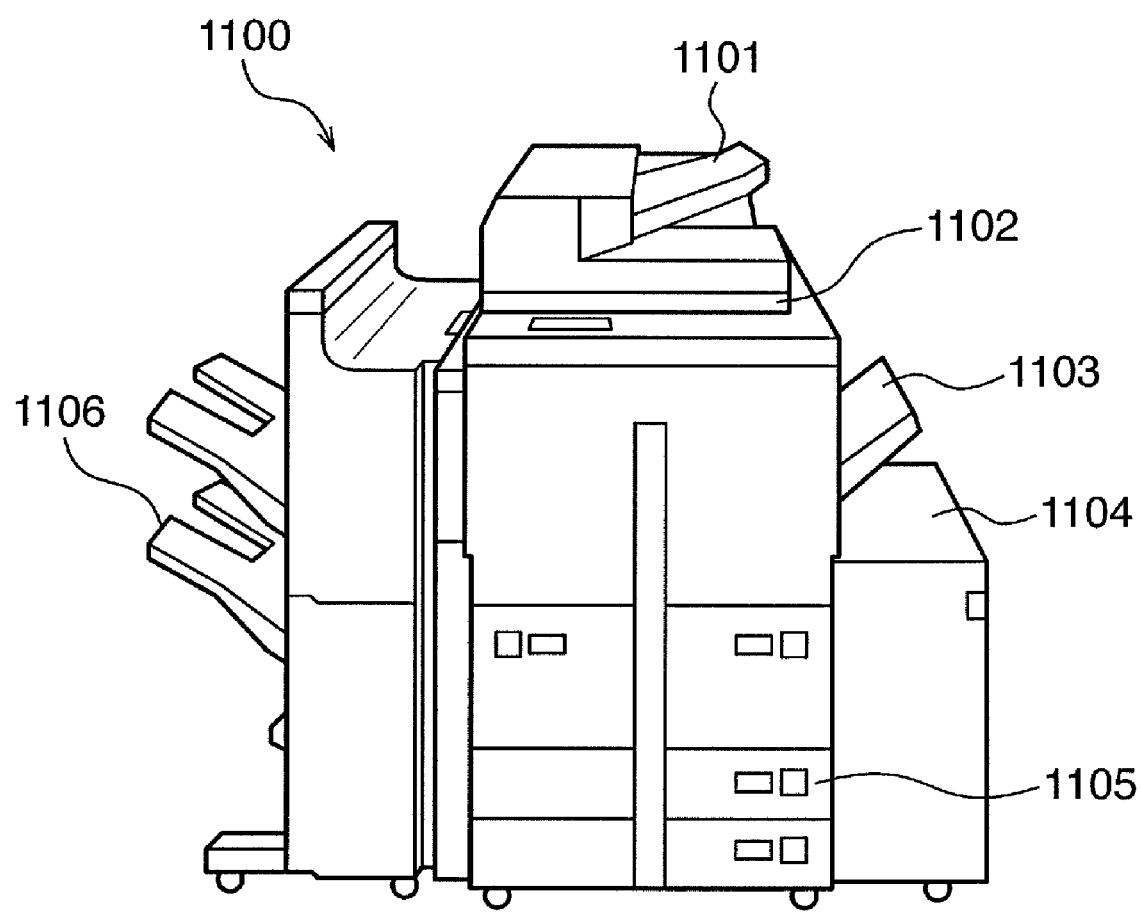
FIG. 12 is a view of the outer appearance of an image forming apparatus adopted in the second embodiment.

FIG. 12 is a view showing the outer appearance of a digital multifunctional peripheral (MFP) in the second embodiment. The digital multifunctional peripheral (MFP) shown in FIG. 12 is also applicable to the first embodiment.

In FIG. 12, reference numeral 1100 denotes a whole copying apparatus. Reference numeral 1101 denotes an ADF (Auto Document Feeder) for automatically sequentially scanning a document bundle. Reference numeral 1102 denotes an operation panel which allows the user to make various settings and adjustment, and confirm the device status. Reference numeral 1103 denotes a multiple manual feeder for setting special-purpose paper or the like. Reference numeral 1104 denotes a side paper deck capable of holding a large number of paper sheets for printing. Reference numeral 1105 denotes a cassette paper deck capable of holding paper sheets of various sizes in respective stages. Reference numeral 1106 denotes a finisher capable of performing various finishing processes such as stapling, punching, and bookbinding.

Figure 13:
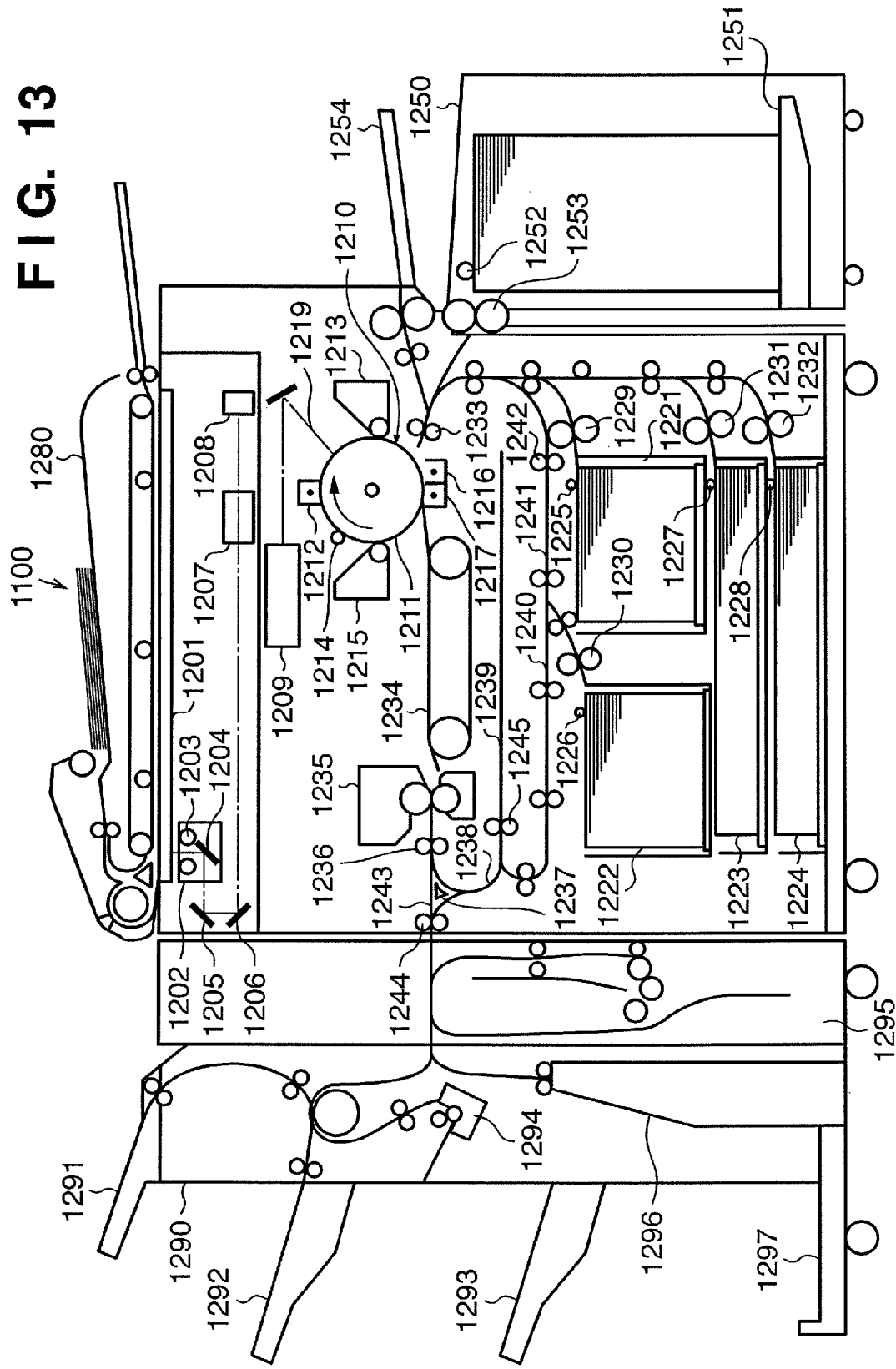
FIG. 13 is a sectional view of the image forming apparatus in the second embodiment.

FIG. 13 is a sectional view of the digital copying apparatus 1100. Reference numeral 1280 denotes an ADF (Auto Document Feeder). Reference numeral 1201 denotes a platen glass serving as a document table. Reference numeral 1202 denotes a scanner which comprises a scanning mirror 1204, illumination lamp 1203, and the like. The scanner reciprocally scans in a predetermined direction, and reflected light passed through a lens 1207 via scanning mirrors 1204 to 1206 to form an image on a CCD sensor in an image sensor 1208.

Reference numeral 1209 denotes an exposure control unit which comprises a laser, polygon scanner, and the like, and irradiates a photosensitive drum 1211 with a laser beam 1219 modulated on the basis of an image signal that is converted into an electrical signal by the image sensor unit 1208 and undergoes a predetermined image process to be described later. A primary charger 1212, developing unit 1213, transfer charger 1216, pre-exposure lamp 1214, and cleaning device 1215 surround the photosensitive drum 1211. In an image forming section 1210, the photosensitive drum 1211 rotates in a direction indicated by an arrow in FIG. 13 by a motor (not shown). The primary charger 1212 charges the photosensitive drum 1211 to a desired potential, and the laser beam 1219 traveling from the exposure control unit 1209 irradiates the photosensitive drum 1211, forming an electrostatic latent image. The developing unit 1213 develops the electrostatic latent image formed on the photosensitive drum 1211 to visualize the electrostatic latent image as a toner image.

Feed rollers 1229, 1230, 1231, or 1232 send to the main body a print paper sheet picked up by a pickup roller 1225, 1226, 1227, or 1228 from an upper cassette deck 1221, left cassette deck 1222, upper cassette 1223, or lower cassette 1224. Registration rollers 1233 feed the print paper sheet to a transfer belt 1234. The transfer charger 1216 transfers the visualized toner image onto the print paper sheet. The cleaning device 1215 cleans residual toner from the photosensitive drum 1211 after transfer, and the pre-exposure lamp 1214 removes residual charges. A separation charger 1217 separates the print paper sheet after transfer from the photosensitive drum 1211, and the transfer belt 1234 sends the print paper sheet to a fixing unit 1235. The fixing unit 1235 presses, heats, and thereby fixes the toner image, and discharge rollers 1236 discharge the print paper sheet outside the main body 1100.

The main body 1100 comprises a deck 1250 capable of storing, e.g., 4,000 print paper sheets. A lifter 1251 of the deck 1250 moves up in accordance with the number of print paper sheets so that a print paper sheet always abuts against a pickup roller 1252. A paper feed roller 1253 sends a print paper sheet to the main body. The main body 1100 also comprises a multiple manual feeder 1254 capable of storing 100 print paper sheets.

In FIG. 13, reference numeral 1237 denotes a delivery flapper which switches the path between a convey path 1238 and a discharge path 1243. Reference numeral 1240 denotes a lower convey path which reverses a print paper sheet sent from the discharge rollers 1236 via a reverse path 1239, and guides the print paper sheet to a refeed path 1241. A print paper sheet fed from the left cassette deck 1222 by the feed rollers 1230 is also guided to the refeed path 1241. Reference numerals 1242 denote refeed rollers which refeed a print paper sheet to the image forming section 1210. Reference numerals 1244 denote discharge rollers which exist near the delivery flapper 1237 and discharge, outside the apparatus, a print paper sheet switched to the discharge path 1243 by the delivery flapper 1237.

In double-sided printing (double-sided copying), the delivery flapper 1237 moves up to guide a copied print paper sheet to the refeed path 1241 via the convey path 1238, reverse path 1239, and lower convey path 1240. At this time, reverse rollers 1245 help the trailing end of the print paper sheet to entirely pass through the convey path 1238. The reverse rollers 1245 guide the print paper sheet to the reverse path 1239 at a position where the reverse rollers 1245 pinch the print paper sheet. After that, the reverse rollers 1245 rotate reversely to send the print paper sheet to the convey path 1240. To reverse a print paper sheet and discharge it from the main body, the delivery flapper 1237 moves up, and the reverse rollers 1245 guide the print paper sheet to the reverse path 1239 at a position where the trailing end of the print paper remains on the convey path 1238. Then, the reverse rollers 1245 rotate reversely to reverse the print paper sheet and send it to the discharge roller 1244.

Reference numeral 1290 denotes a delivery processing device which aligns and binds print paper sheets discharged from the main body 1100. The delivery processing device 1290 stacks and aligns print paper sheets discharged one by one onto a processing tray 1294. After the end of discharging one copy bearing an image, the delivery processing device 1290 staples the print paper bundle and discharges it onto a delivery tray 1292 or 1293. A motor (not shown) controls vertical movement of the delivery tray 1293, and the delivery tray 1293 moves to the position of the processing tray 1294 before the start of an image forming operation. As discharged print paper sheets are stacked on the delivery tray 1293, the delivery tray 1293 moves to make the level of the sheet surface flush with the position of the processing tray 1294. The delivery processing device 1290 comprises a lower tray limit sensor (not shown) which detects the lower limit of the delivery tray 1293 so as to detect stacking of about 2,000 print paper sheets on the delivery tray 1293. Reference numeral 1291 denotes a paper tray which stacks slip sheets to be inserted between discharged print paper sheets; and 1295, a Z-folding device which Z-folds a discharged print paper sheet. Reference numeral 1296 denotes a bookbinding device which folds some of discharged print paper sheets at the center and staples the folded print paper sheets to bind them. The bound paper bundle is discharged onto a discharge tray 1297.

Figure 14:
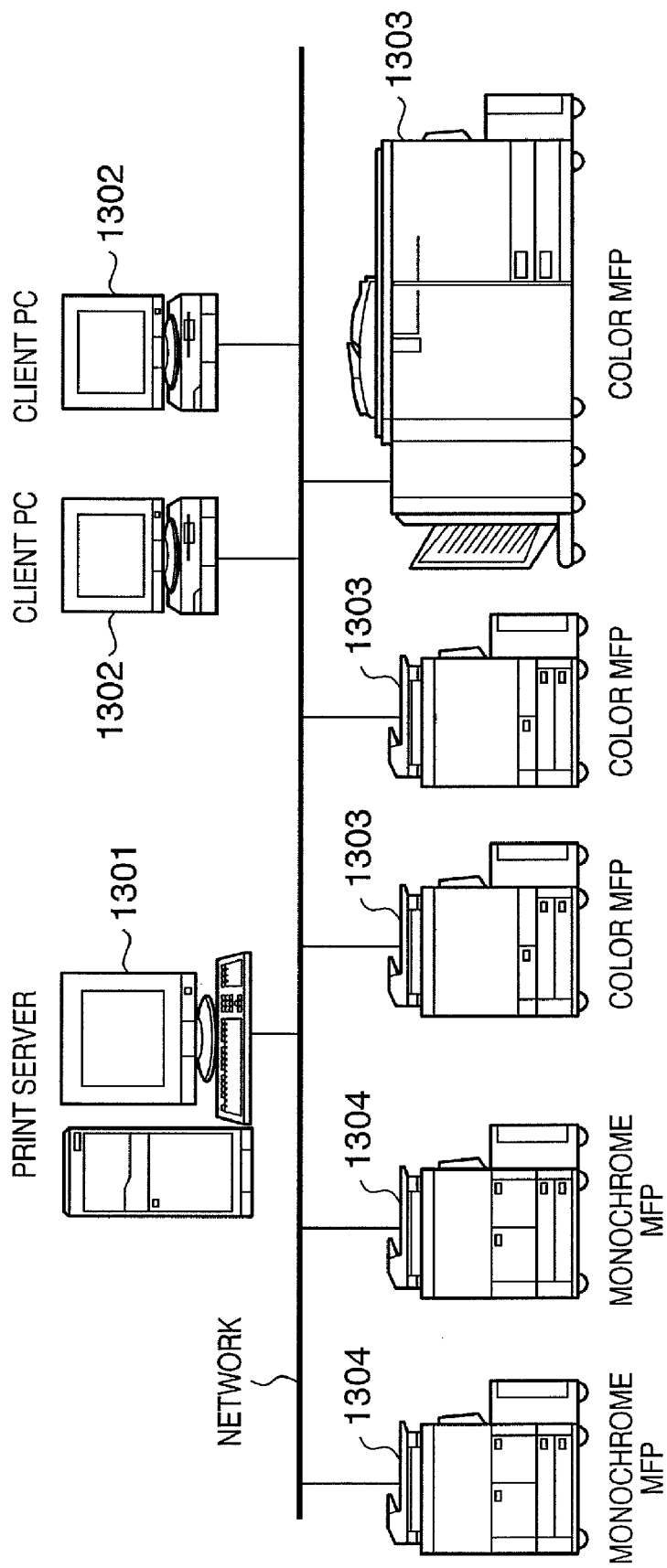
FIG. 14 is a view of the configuration of a printing system in the second embodiment.

FIG. 14 is a view showing the configuration of a digital printing system in the second embodiment.

The digital printing system comprises at least one print server 1301, client PC 1302, color MFP 1303, and monochrome MFP 1304 which connect to a network.

The print server 1301 plays two roles. One role is to externally exchange information. The print server 1301 receives image information, setting information, and the like of an entered job, and after the end of the job, notifies the outside of information such as the status. The other role is to manage and control the system. The print server 1301 unitarily manages an externally input job and a job generated in a digital printing unit. The print server 1301 can monitor the statuses of all devices and all jobs in the digital printing unit. At the same time, the print server 1301 can perform control such as holding, setting change, or printing restart of a job, or copying, movement, or deletion of a job.

The client PC 1302 plays a role of editing an input application file, designating printing, or inputting a print-ready file. In addition, the client PC 1302 plays a role of assisting monitoring and control of devices and jobs managed in the print server 1301.

The color MFP 1303 and monochrome MFP 1304 are image forming apparatuses (described with reference to FIGS. 12 and 13) having various functions such as scanning, printing, and copying functions. The color MFP and monochrome MFP are different in speed, cost, and the like, and must be selectively used in accordance with the application purpose.

The arrangement of the MFP will be explained with reference to FIG. 15.

The MFP incorporates a memory such as a hard disk capable of storing a plurality of job data. The MFP implements a copying function capable of printing job data output from a scanner by the printing unit via the memory. The MFP implements a printing function capable of printing job data output from an external device such as a computer by the printer unit via the memory. As a result, the MFP constructs an image forming apparatus having a plurality of functions.

As described above, MFPs are classified into full-color MFPs and monochrome MFPs. In many cases, the full-color MFP includes the arrangement of the monochrome MFP at the basic part except a color process, internal data, and the like. Thus, the full-color MFP will be mainly explained, and a description of the monochrome MFP will be added, as needed.

The system may comprise a multi-function type image forming apparatus having a plurality of functions, as described above. However, the system may comprise an SFP (Single Function Peripheral) which is a single-function type image forming apparatus having only the printing function. Alternatively, the system may comprise an image forming apparatus of either type. The system may comprise a plurality of image forming apparatuses of either type. In any case, the system suffices to achieve control according to the second embodiment.

Figure 15:
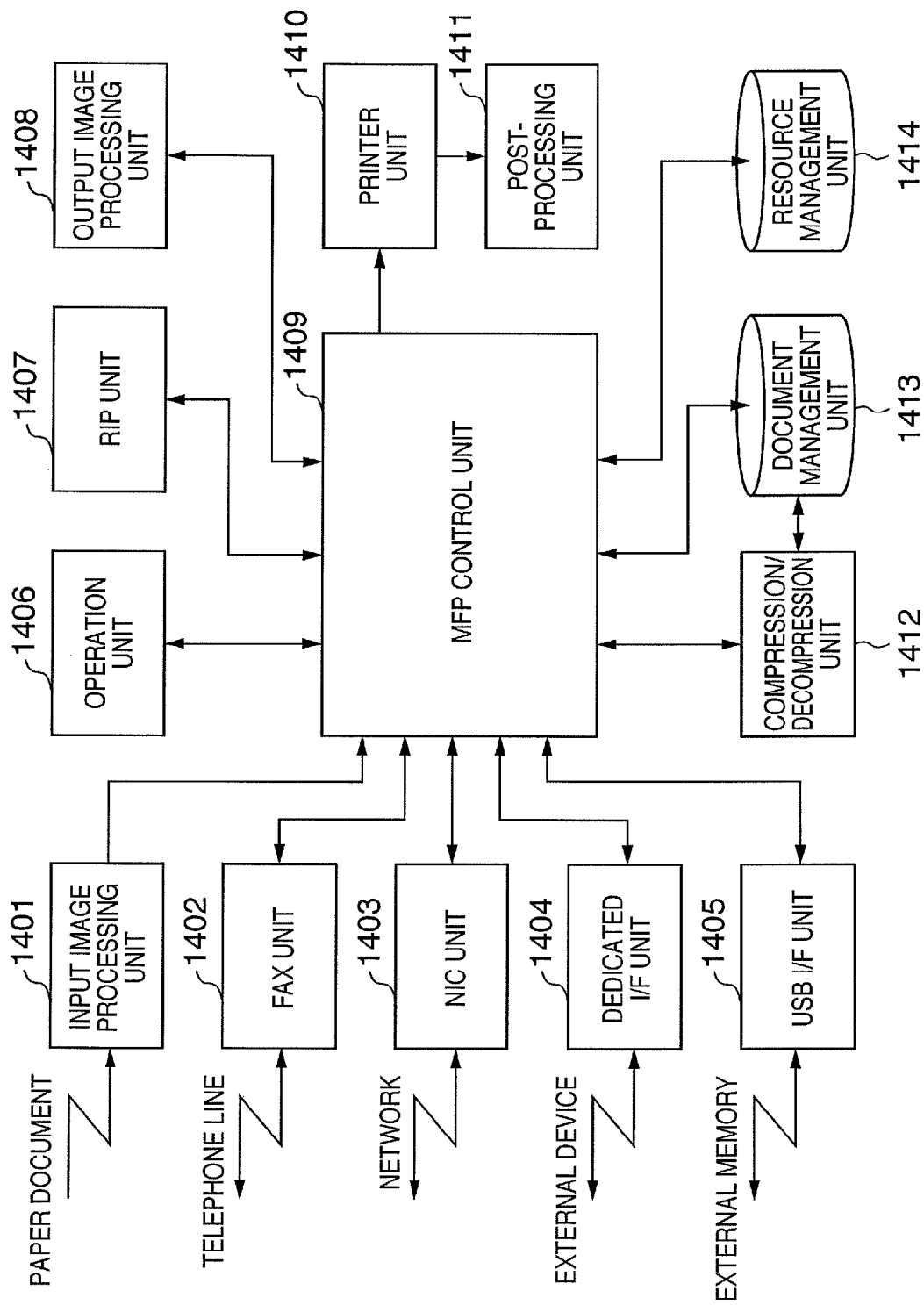
FIG. 15 is a block diagram of the image forming apparatus in the second embodiment.

As shown in FIG. 15, the image forming apparatus in the second embodiment comprises an input image processing unit 1401 which scans an image of a paper document or the like and processes the scanned image data. The image forming apparatus comprises a FAX unit 1402 which is typified by a facsimile machine or the like and transmits/receives an image using a telephone line. The image forming apparatus comprises a NIC (Network Interface Card) unit 1403 which exchanges image data and apparatus information using a network. The image forming apparatus comprises a dedicated interface unit 1404 which exchanges information such as image data with an external device. The image forming apparatus also comprises a USB (Universal Serial Bus) interface (USB I/F) unit 1405 which exchanges image data and the like with a USB device typified by a USB memory (kind of removable medium).

An MFP control unit 1409 plays a role of controlling processes such as a process to temporarily save image data in accordance with the application purpose of the MFP and a process to determine a path.

A document management unit 1413 comprises a memory such as a hard disk capable of storing a plurality of image data. The control unit (e.g., the CPU of the MFP control unit) of the image forming apparatus acts as an entity to store, in the hard disk, image data from the input image processing unit 1401 and image data of a facsimile job input via the FAX unit 1402. The hard disk can also store a plurality of types of image data such as image data input from an external device (e.g., a computer) via the NIC unit 1403 and various image data input via the dedicated I/F unit 1404 and USB I/F unit 1405. The MFP control unit 1409 controls to read out image data stored in the hard disk, as needed, transfer the image data to an output unit 1408 such as a printer unit, and execute an output process such as a printing process by the printer unit 1408. The MFP control unit 1409 controls to transfer image data read out from the hard disk to an external device such as a computer or another image forming apparatus in accordance with an instruction from the operator.

The MFP control unit 1409 performs, via a compression/decompression unit 1412, a process to compress and store image data, as needed, when storing the image data in the document management unit 1413, and a process to decompress compressed/stored image data into original image data when reading out the image data. It is generally known to use data compressed by JPEG, JBIG, ZIP, or the like when transferring data through a network. After the MFP receives such data, the compression/decompression unit 1412 decompresses the data.

A resource management unit 1414 stores various commonly used parameter tables (e.g., the font, color profile, and gamma table). The resource management unit 1414 can call these pieces of information, as needed. In addition, the resource management unit 1414 stores a new parameter table, and corrects and updates the parameter table.

When the MFP control unit 1409 receives PDL data, a RIP unit 1407 performs a RIP (Raster Image Processor) process for the PDL data. If necessary, an output image processing unit 1408 performs an image process for printing on an image to be printed. If necessary, the document management unit 1413 can also store again intermediate data of image data generated at this time, and print ready data (bitmap data for printing or compressed data of the bitmap data).

A printer unit 1410 which forms an image receives image data. A post-processing unit 1411 receives a sheet printed out from the printer unit, and performs a sheet sorting process and sheet finishing process.

The MFP control unit 1409 plays a role of smoothly flowing a job, and the path switches as follows in accordance with the use method of the MFP. It is generally known to store image data as intermediate data, as needed. However, a description of accesses except those which start and end in the document management unit will be omitted. A flow will be roughly described by omitting processes by the compression/decompression unit 1412 and post-processing unit which are used as needed, those by the MFP control unit 1409 serving as the core of the whole system, and the like.

A) Copying function: the input image processing unit→the output image processing unit→the printer unit
B) FAX transmission function: the input image processing unit→the FAX unit
C) FAX reception function: the FAX unit→the output image processing unit→the printer unit
D) Network scan: the input image processing unit→the NIC unit
E) Network printing: the NIC unit→the RIP unit→the output image processing unit→the printer unit
F) Scan to external device: the input image processing unit→the dedicated I/F unit
G) Printing from external device: the dedicated I/F unit→the output image processing unit→the printer unit
H) Scan to external memory: the input image processing unit→the USB I/F unit
I) Printing from external memory: the USB I/F unit→the RIP unit→the output image processing unit→the printer unit
J) Box scan function: the input image processing unit→the output image processing unit→the document management unit
K) Box printing function: the document management unit→the printer unit
L) Box reception function: the NIC unit→the RIP unit→the output image processing unit→the document management unit
M) Box transmission function: the document management unit→the NIC unit
N) Preview function: the document management unit→an operation unit In addition to the above functions, combinations with various functions such as an E-mail service and Web server function are conceivable, but a description thereof will be omitted.

Box scan, box printing, box reception, or box transmission is an MFP processing function accompanying write and read of data using the document management unit 1413. These processing functions are to divide the memory in the document management unit for respective jobs and respective users, temporarily save data, and input/output data in combination with a user ID and password.

The operation unit is used to select various flows and functions described above and designate an operation. With a high-resolution display device of an operation unit 1406, for example, a process to preview image data stored in the document management unit, and if the image data is checked "OK", print the image data can also be implemented.

Figure 16:
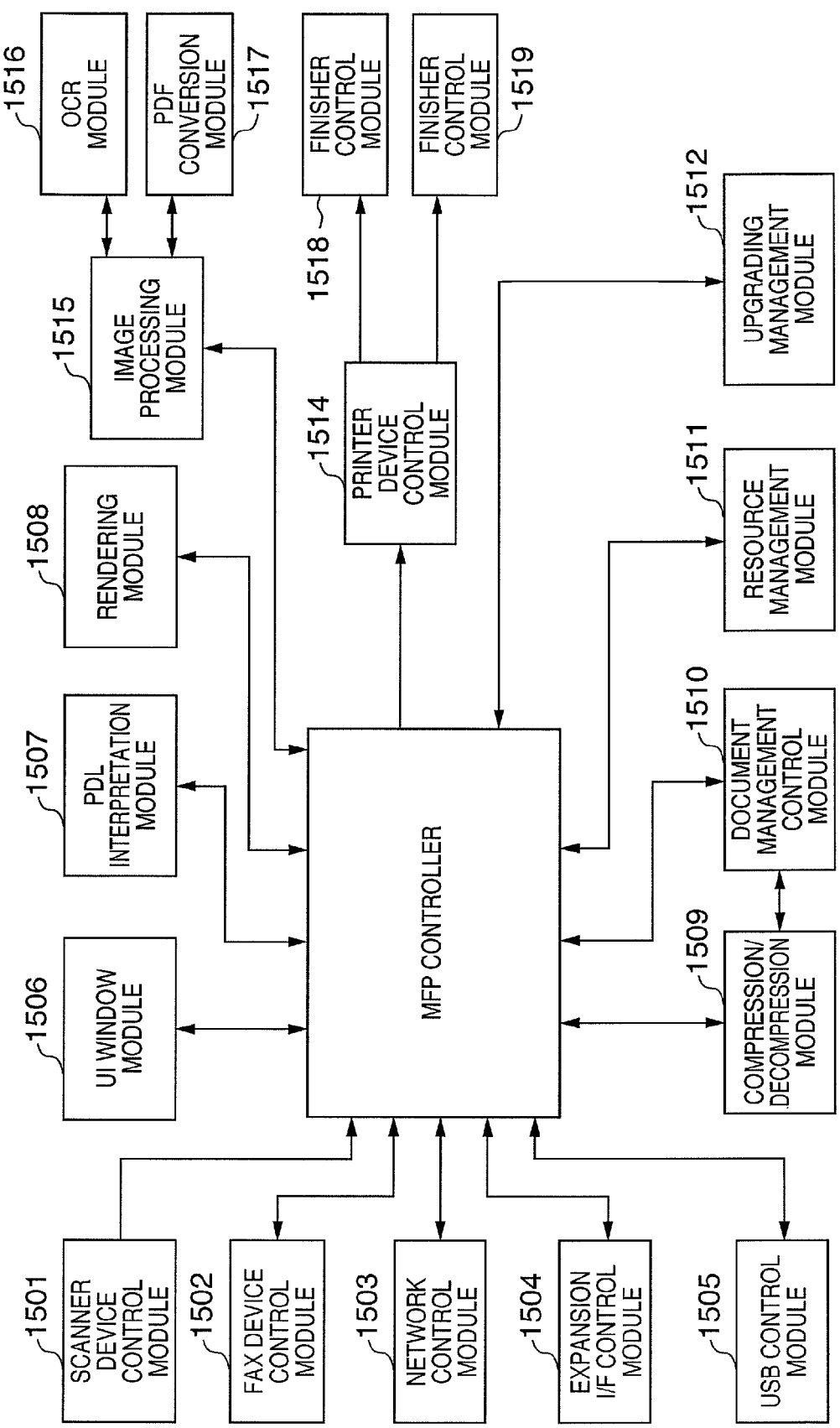
FIG. 16 is a block diagram showing the configuration of software modules of the image forming apparatus in the second embodiment.

The configuration of software modules of the MFP in the second embodiment will be explained with reference to FIG. 16. The respective software modules shown in FIG. 16 can be independently executed, similar to the above-described first embodiment, and are stored in a rewritable storage device (e.g., a hard disk or flash memory). When the hard disk stores software modules, they are loaded into the RAM and executed.

Software modules which control components for inputting data among the blocks shown in FIG. 15 will be explained. A scanner device control module 1501 controls an input image processing unit (scanner device) which scans an image of a paper document or the like and processes the scanned image data. A FAX device control module 1502 controls a FAX unit. A network control module 1503 controls a network. An expansion interface control module 1504 controls an interface with an external device. A USB control module 1505 controls a USB device. A UI window module 1506 controls a user interface window (UI panel).

Software modules which control components for processing an image among the blocks shown in FIG. 15 will be explained. A PDL interpretation module 1507 expands PDF data input from a user via the network control module 1503, and converts the expanded data into a display list format. A rendering module 1508 converts the display list data converted by the PDL interpretation module 1507 into image data. An image processing module 1515 is optionally added/omitted. In FIG. 16, for example, the image processing module 1515 is dedicated to an OCR (Optical Character Recognition) module 1516 and PDF conversion module 1517. The OCR module 1516 OCR-processes image data. The PDF conversion module 1517 is used to covert image data into the PDF format.

Software modules which control components for forming an image among the blocks shown in FIG. 15 will be explained. A printer device control module 1514 forms an image of image data which is input to the MFP, undergoes various image processes, and is stored in the hard disk. After the printer device control module forms an image, the image is sent to a post-processing step and undergoes various post-processes. For example, FIG. 16 shows only two types of finisher control modules 1518 and 1519 as post-processes. A larger number of post-processes can be performed by adding options.

An MFP controller 1513 plays a role of supervising various software modules. The MFP controller 1513 plays a role of controlling various data processes such as a process to temporarily save image data in accordance with the application purpose of the MFP and a process to determine a path.

A document management control module 1510 manages the hard disk. For example, the control unit (e.g., the CPU of the MFP control unit) of the image forming apparatus acts as an entity to store and manage image data from the scanner device control module 1501. The document management control module 1510 also manages image data of a facsimile job input via the FAX device control module 1502, and image data input from an external device (e.g., a computer) via the network control module 1503. The document management control module 1510 also manages a plurality of types of image data such as image data input via the expansion interface control module 1504 and USB control module 1505. The document management control module 1510 can read out image data stored in the hard disk, as needed, transfer the image data to an output module such as the printer device control module 1514, and execute an output process such as a printing process by the printer unit. The document management control module 1510 controls to transfer image data read out from the hard disk to an external device such as a computer or another image forming apparatus in accordance with an instruction from the operator.

A compression/decompression module 1509 is used to perform a process to compress and store image data when storing the image data in the document management unit, and a process to decompress dompressed/stored image data into original image data when reading out the image data. Hardware sometimes implements compression and decompression. Even in this case, the compression/decompression module 1509 controls the compression/decompression device. It is generally known to use data compressed by JPEG, JBIG, ZIP, or the like when transferring data through a network. After the MFP receives such data, the compression/decompression module 1509 decompresses the data.

A resource management module 1511 can call commonly used various parameter tables (e.g., the font, color profile, and gamma table), as needed. The resource management module 1511 can store a new parameter table, and correct and update the parameter table.

The printer device control module 1514 which forms an image receives image data. The post-processing module 1518 receives a sheet printed out from the printer unit, and performs a sheet sorting process and sheet finishing process.

An upgrading management module 1512 manages upgrading of a software module. The upgrading management module 1512 manages the versions of various modules, and downloads and installs a module.

The above configuration is merely an example of a combination of installed software modules. In addition to the above configuration, various software module configurations to be installed are conceivable by combinations with various functions such as an E-mail service and Web server function. However, a description of these configurations will be omitted. The above-described granularity of software modules is merely an example, and software modules may be installed at lower or higher granularity.

Figure 17:
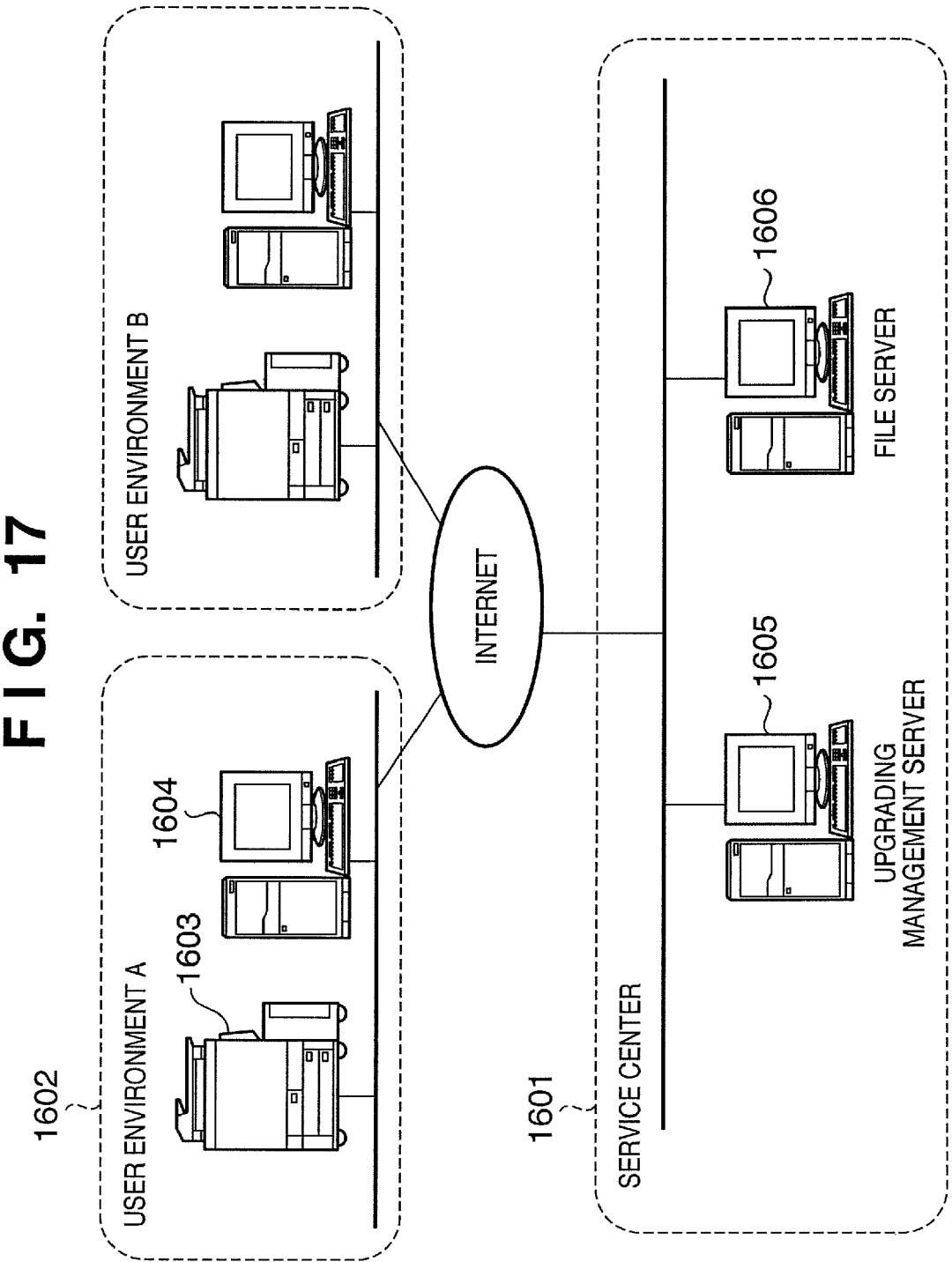
FIG. 17 is a view showing the relationship between the service center and the user environment in the second embodiment.

FIG. 17 is a block diagram showing an example of a network configuration.

A service center 1601 comprises an upgrading management server 1605 and file server 1606. A user environment 1602 and the service center 1601 connect to each other via the Internet, a public line, or the like, and can exchange necessary information.

The upgrading management server 1605 in the service center 1601 manages the version of firmware installed in an MFP 1603 located in the user environment 1602. If the firmware needs to be upgraded, the upgrading management server 1605 notifies the MFP 1603 of this, or responds to an inquiry from the MFP 1603 about whether to upgrade the firmware. The file server 1606 stores MFP firmware.

The MFP 1603 in the user environment 1602 may manage the version of firmware installed in it, or a print server 1604 may manage the version.

Figure 18:
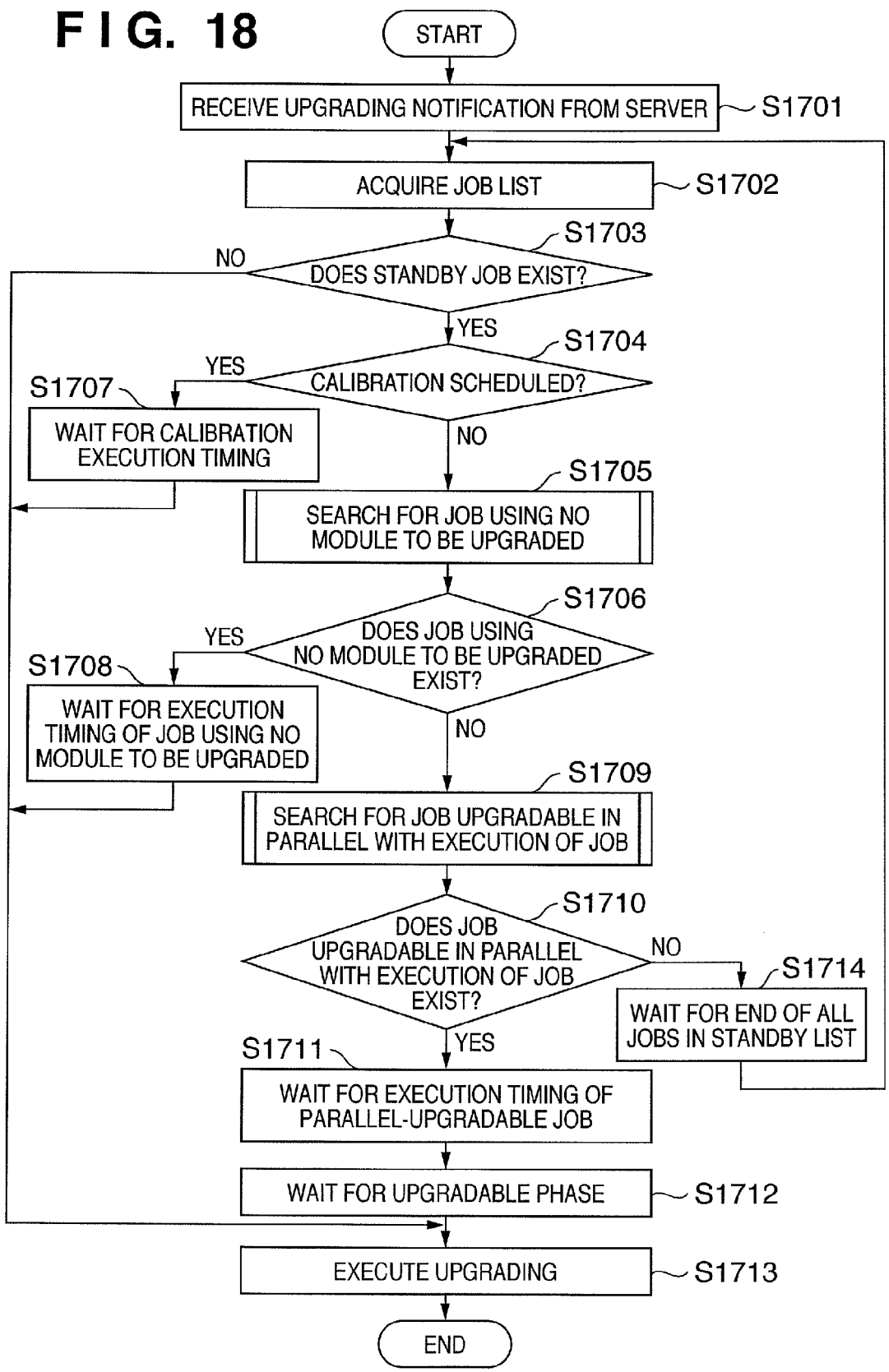
FIG. 18 is a flowchart showing software module upgrading process procedures by the image forming apparatus in the second embodiment.

FIG. 18 is a flowchart showing software upgrading process procedures in the MFP.

In step S1701, the MFP receives an upgrading notification (containing identification information of a software module to be upgraded) from the upgrading management server 1605 of the service center 1601. This is merely an example of the practice. The MFP may inquire whether to upgrade a software module of the service center 1601, and when determining to upgrade a software module, start upgrading it. In the following description, the service center 1601 issues an MFP upgrading notification.

The process advances to step S1702 to acquire a job list held in the MFP. The job list structure has a format shown in FIG. 19, and jobs input to the MFP are listed. The job list represents each job registered in the job queue. A job registered in the job queue is executed immediately after becoming executable. Registration of such a job is discriminated from that of the above-described timer job.

In step S1703, the MFP determines whether a standby job exists in the acquired job list (FIG. 19). If no standby job exists in the job list, the MFP can immediately upgrade a software module. The process advances to step S1713 to download a software module to be actually upgraded, upgrade it, and end a series of upgrading processes.

If a standby job exists in the job list, the process advances to step S1704 to check whether calibration is scheduled. The MFP periodically performs calibration in order to uniform the image quality of an output material. If calibration is scheduled, firmware is upgradable in parallel with calibration. If the MFP determines in step S1704 that calibration is scheduled, the process advances to step S1707 to wait for the execution timing of calibration. At the execution timing of calibration, the process advances to step S1713 to upgrade a software module and end a series of upgrading processes.

If the MFP determines in step S1704 that no calibration is scheduled, the process advances to subroutine step S1705. This subroutine will be explained with reference to FIG. 20.

Figure 20:
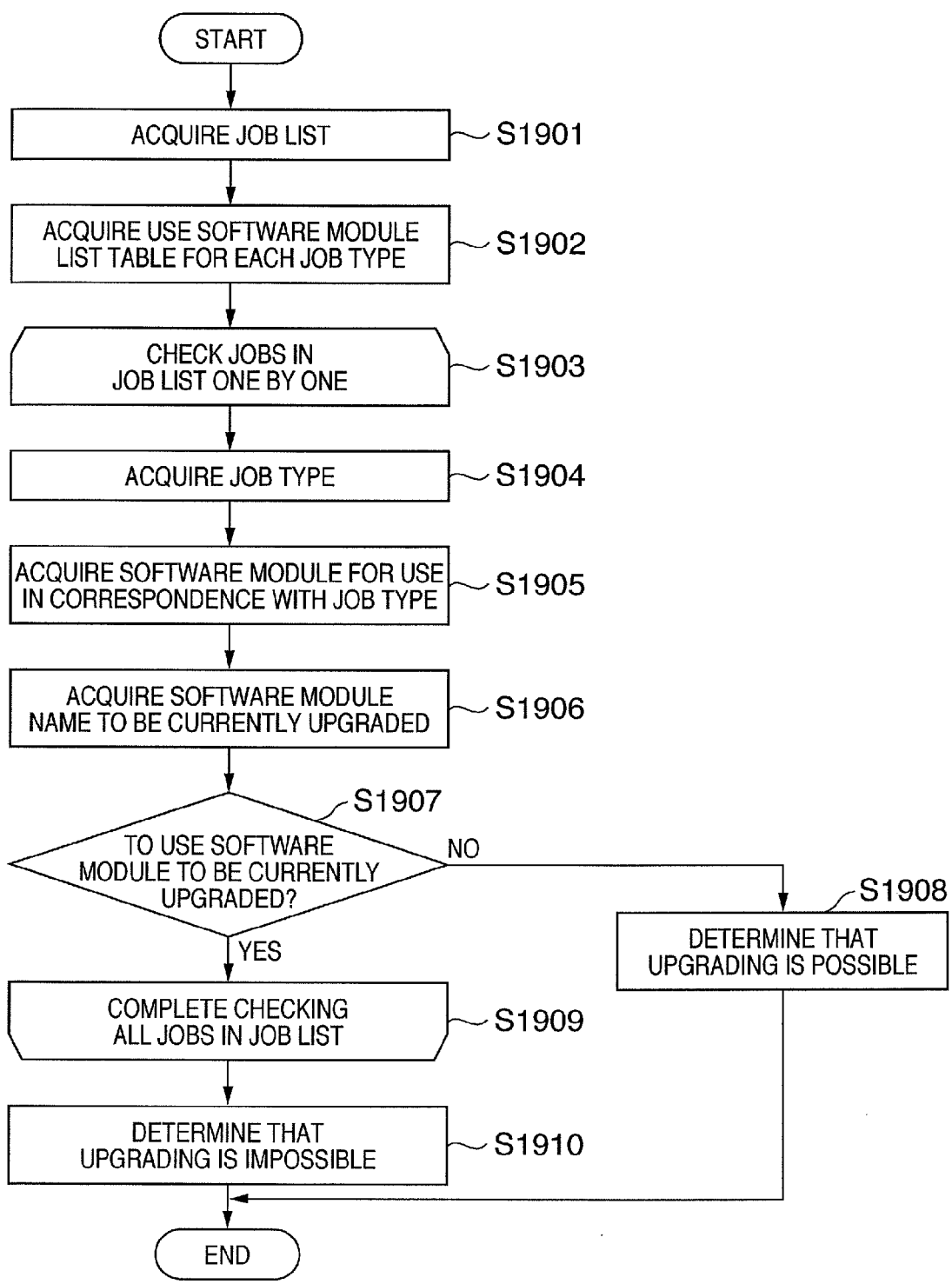
FIG. 20 is a flowchart showing details of step S1705 in FIG. 18.

FIG. 20 shows procedures to check upgrading of each job type. In step S1901, the MFP acquires a job list (FIG. 19). In step S1902, the MFP acquires a use software module list table for each job type. The table has a format shown in FIG. 21, and lists software modules used for each job type. Although FIG. 21 shows an example of only four job types, the table describes all job types executable by the MFP.

Steps S1903 to S1908 form a loop to extract jobs one by one from the job list acquired in step S1901 and check them. After checking all jobs in the job list, the process escapes from the loop.

In step S1904, the MFP acquires the job type of a job extracted from the job list. In step S1905, the MFP compares the job type of the table (FIG. 21) acquired in step S1902 with the job type acquired in step S1904, acquiring a software module list used for the job type.

In step S1906, the MFP acquires a software module name to be currently upgraded. In step S1907, the MFP compares a software module acquired in step S1905 for use in the job with the software module acquired in step S1906 to check whether upgrading is possible during execution of the job.

For example, the module to be currently upgraded is a scanner device control module, and the job type is a PDL print job. Software modules used in the PDL print job are "network control module, PDL interpretation module, rendering module, compression/decompression module, document management module, and printer device control module". Hence, the MFP does not use any scanner device control module during execution of the PDL print job. The MFP determines that PDL upgrading is possible. If, however, the module to be upgraded is, e.g., the document management module, the document management module cannot be upgraded during execution of the job, so the MFP checks the next job.

If the MFP determines in step S1907 that upgrading is possible, the process advances to step S1908 to set, as a return value, information representing that there is a job using no module to be upgraded, and the process escapes from the loop.

If the MFP determines in step S1907 that upgrading is impossible during execution of the job, the process advances to step S1909 to determine the next job in the next job list by looping. If the MFP cannot find out any upgradable job after checking all jobs in the job list, the process escapes from the loop and advances to step S1910. In step S1910, the MFP sets, as a return value, information representing that only jobs using the module to be upgraded remain, and the routine ends.

Referring back to FIG. 18, in step S1706, the MFP determines the result of executing the subroutine (FIG. 20) in step S1705. If the MFP determines as a result of executing the subroutine (FIG. 20) that a job using no module to be upgraded exists in the job list, the process advances to step S1708 to wait for execution of the job using no module to be upgraded. At the execution timing of the job (job execution period), the process advances to step S1713 to upgrade the software module and end a series of upgrading processes.

If the MFP determines in step S1706 that only jobs using the module to be upgraded remain (step S1910), the process advances to a subroutine (FIG. 22) in step S1709 to perform more detailed check.

Figure 22:
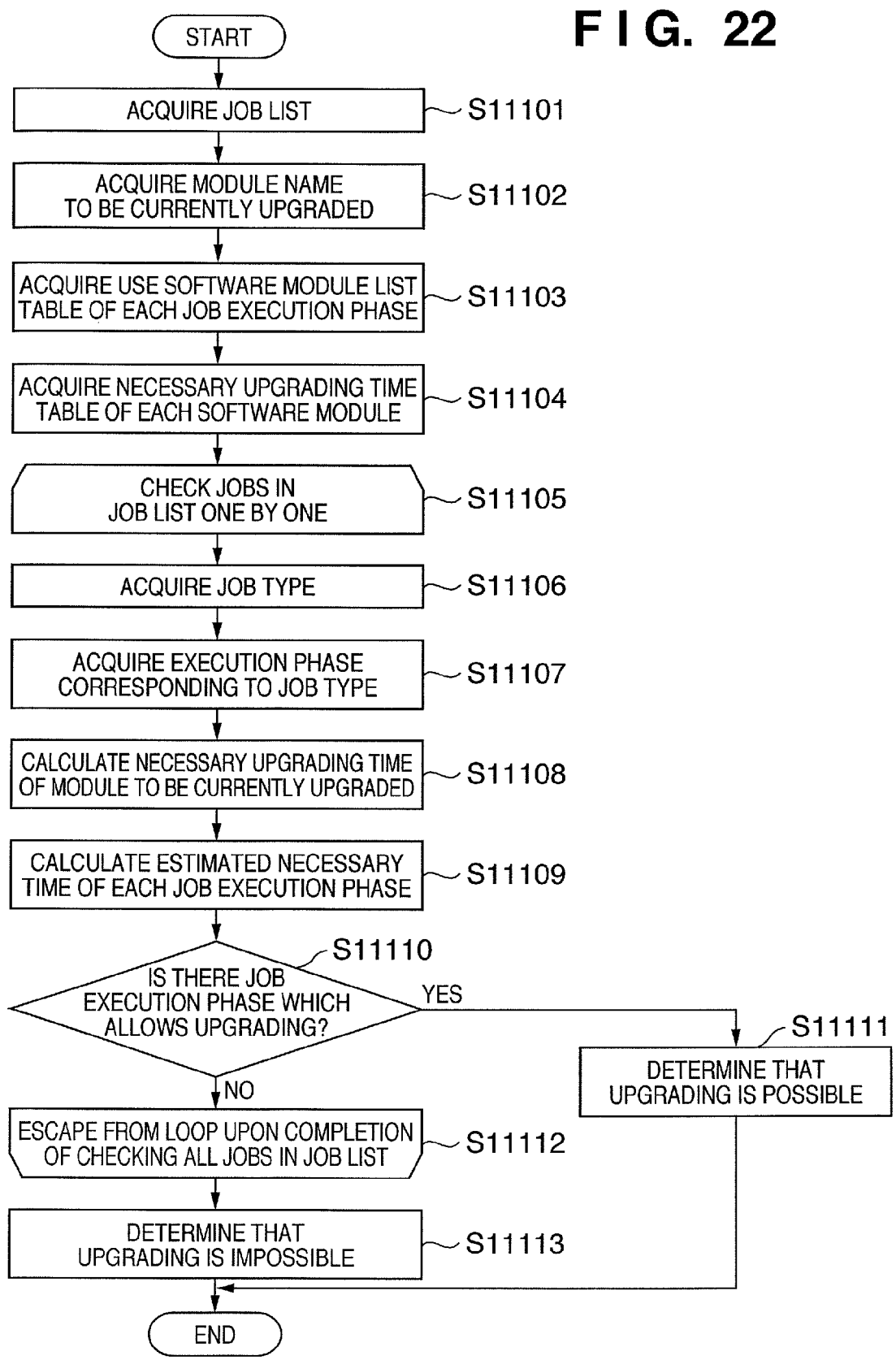
FIG. 22 is a flowchart showing details of step S1709 in FIG. 18.

FIG. 22 is a flowchart showing an upgrading check process in each execution phase of the job in step S1709.

In step S11101, the MFP acquires a job list (FIG. 19). In step S11102, the MFP acquires a software module name to be currently upgraded. In step S11103, the MFP acquires a use software module list table in each job execution phase (FIGS. 23A and 23B).

This table represents a list of software modules used in respective execution phases divided for each job type. For example, a copy job is divided into three phases "UI operation, scan execution, and print execution". The UI operation phase utilizes a UI window module. The scan execution phase utilizes a scanner device control module, compression/decompression module, and document management control module. The print execution phase utilizes a compression/decompression module, document management module, and printer device control module.

Two tables shown in FIGS. 23A and 23B represent lists in, e.g., the PDL print job and copy job, and similar tables exist for other job types. Modules used for each job type may change depending on the device, and the tables in FIGS. 23A and 23B are merely examples.

In step S11104, the MFP acquires the necessary upgrading time table (FIG. 24) of each software module. This table stores an estimated time necessary to download an upgrade module for each module from the file server 1606 present in the service center 1601. This table also stores a time necessary to actually upgrade a software module using the downloaded module. The MFP can acquire the table from the file server 1606 present in the service center 1601.

Steps S11105 to S11112 form a loop, and are looped by the number of jobs present in the job list acquired in step S11101 to check all registered jobs. In step S11106, the MFP acquires the job type of a target job. In step S11107, the MFP compares the job type acquired in step S11106 with the use software module list table of each job execution phase acquired in step S11103, acquiring the execution phase of the job. For example, when the job type is a PDL print job, the MFP acquires three phases: a data reception phase, PDL expansion phase, and print phase.

In step S11108, the MFP calculates a necessary upgrading time on the basis of the module. name which is acquired in step S11102 and is to be currently upgraded, and the necessary upgrading time table of each software module acquired in step S11104. For example, when the module to be currently upgraded is the printer device control module, the MFP can obtain a calculation result of 100 sec as a total of the estimated download time and necessary upgrading time.

In step S11109, the MFP calculates times necessary for the respective job execution phases acquired in step S11107. The necessary time changes depending on the phase. Although not shown, the necessary time can be calculated from the data size of PDL data for the PDL expansion phase, and from the number of copy documents for the scan phase of the copy job.

In step S11110, the MFP determines whether upgrading is possible during execution of the job, from the job execution phases acquired in step S11107, the necessary upgrading time calculated in step S11108, and the times necessary for the respective job execution phases calculated in step S11109.

For example, to upgrade the printer device control module, the MFP calculates a time of 100 sec necessary to upgrade the printer device control module in step S11108. When the job during the check is a PDL print job and the PDL data size is 50 Mbytes, the MFP obtains an execution time of 180 sec necessary in the PDL expansion phase by calculation in step S11109. In this case, the MFP determines that the printer device is upgradable in the PDL expansion phase during execution of the job.

If the MFP determines in step S11110 that there is a job execution phase which allows upgrading, the process escapes from the loop, advances to step S11111, and ends the upgrading check process in each execution phase of the job.

If the MFP determines in step S11110 that there is no job execution phase which allows upgrading, the loop is repeated to check all jobs registered in the job list. If the MFP cannot find out any upgradable job after checking all jobs, the process escapes from the loop and advances to step S11113 to end the upgrading check process in each execution phase of the job.

Referring back to FIG. 18, in step S1710, the MFP determines the result of executing the subroutine (FIG. 22) in step S1709. If the MFP determines as a result of executing the subroutine (FIG. 22) that the job list registers a job upgradable in parallel with the job (a job determined to be parallel-upgradable (YES) as a result of detailed search by dividing the job into respective execution phases), the process advances to step S1711. In step S1711, the process waits for the execution timing of a parallel-upgradable job. At this timing, the process advances to step S1712 to wait for an upgradable phase during execution of the job. In the upgradable phase, the process advances to step S1713 to upgrade the software module and end a series of upgrading processes.

If the MFP determines in step S1710 that upgrading is impossible in parallel with execution of the job, it determines that upgrading is impossible till the completion of all processes of jobs currently registered in the job list, and the process advances to step S1714. In step S1714, the process waits for the end of all standby jobs. At the timing when completing executing all jobs currently registered in the job list, the process advances to step S1702 to repeat the upgrading process again.

As described above, the second embodiment adjusts the upgrading timing on the basis of the contents of a standby job in the job queue when upgrading a software module (software part). The software module can be updated while maintaining the availability of an image processing apparatus such as the MFP.

Third Embodiment

Either or both of processes in the second embodiment and those in the first embodiment may be executed.

For example, all the flowcharts in FIGS. 18, 20, 22, and FIGS. 8 to 11 may be executed to determine whether to update a software part, and change (delete/update) the software part on the basis of the determination. Alternatively, only processes in the second embodiment may be executed.

Fourth Embodiment

The above-described embodiments target a change of one of software parts used to execute one job. However, the number of software parts to be changed is not limited to this. For example, in FIG. 5, a copy job uses five software parts. However, the above-described flowcharts are applicable to even a copy job using two to four software parts. The above-described flowcharts are applicable to even software of one part for executing one job. Needless to say, the above-described flowcharts are also applicable to a job type such as E-mail other than the copy job by changing the number of software parts.

Fifth Embodiment

The above embodiments have described a change process associated with software stored in an image forming apparatus, but the present invention is not limited to this. For example, a form is also assumable in which an external information processing apparatus (image processing apparatus) on the network stores software concerning the image forming apparatus and the image forming apparatus utilizes the software stored in the information processing apparatus (image processing apparatus) to perform a process. In this case, the above-described flowcharts are executed on the basis of the software stored in the information processing apparatus (image processing apparatus) and a job registered in the image forming apparatus.

The embodiments according to the present invention have been described. The present invention is implemented by a computer program which runs in an image processing apparatus or the like. Hence, the computer program for implementing the present invention also falls within the scope of the invention. The computer program is stored in a computer-readable storage medium such as a CD-ROM or memory card, and can run by setting the storage medium in an apparatus, and copying or installing the computer program in the system. Thus, the computer-readable storage medium also falls within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-298100, filed Oct. 12, 2005, which is hereby incorporated by reference herein in its entirety.

What is claimed is:

1. A job processing apparatus which has a rewritable storage unit for storing software and executes a job by using the software, comprising:
 a registration unit for registering a job;
 a specifying unit for specifying a type of software which is used to execute the job registered by said registration unit;
 a first determination unit for, based on a request to change software, determining whether the software to be changed is the type of the software specified by said specifying unit; and
 a second determination unit for determining whether there is another job processing apparatus which can execute the software to be changed,
  wherein, if said first determination unit determines that the software to be changed is the type of the software specified by said specifying unit and said second determination unit determines that there is not another job processing apparatus which can execute the software to be changed, the job processing apparatus restricts a change of the software according to the request, and
  wherein, if said first determination unit determines that the software to be changed is the type of the software specified by said specifying unit and said second determination unit determines that there is another job processing apparatus which can execute the software to be changed, the job processing apparatus performs the change of the software according to the request;
 a reconstruction unit for, when said second determination unit determines that the software to be changed exists in the job processing apparatus and another job processing apparatus, reconstructing information stored in a software information storage unit in order to execute the software to be changed in said another job processing apparatus; and a change holding unit for, when said second determination unit determines that the software to be changed exists in the job processing apparatus and does not exist in any other job processing apparatus, shifting the request to a holding state, wherein said change holding unit comprises:
- a first change unit for, when said first determination unit determines that the software to be changed is not used to execute the registered job or said second determination unit determines that the software to be changed exists in another job processing apparatus, changing the software in accordance with the request; and
- a second change unit for, when the registered job which uses the software to be changed does not exist, changing the software in accordance with the request which is shift to the holding state.

2. The apparatus according to claim 1, wherein the request includes an update request or a deletion request.

3. The apparatus according to claim 1, wherein the job registered by said registration unit includes a timer job having a designated process execution timing.

4. The apparatus according to claim 1, wherein, if said first determination unit determines that the software to be changed is the type of the software specified by said specifying unit and said second determination unit determines that there is another job processing apparatus which can execute the software to be changed, the job processing apparatus changes the software according to the request.

5. A method of controlling a job processing apparatus which has a rewritable storage unit for storing software and executes a job by using the software, comprising:
- a registration step of registering a job;
- a specifying step of specifying a type of software which is used to execute the job registered in said registration step;
- a first determination step of, based on a request to change software, determining whether the software to be changed is the type of the software specified in said specifying step;
- a second determination step of determining whether there is another job processing apparatus which can execute the software to be changed,
  - wherein, if it is determined that the software to be changed is the type of the software specified in said specifying step and it is determined that there is not another job processing apparatus which can execute the software to be changed, the job processing apparatus restricts a change of the software according to the request, and
  - wherein, if it is determined that the software to be changed is the type of the software specified in said specifying step and it is determined that there is another job processing apparatus which can execute the software to be changed, the job processing apparatus performs the change of the software according to the request;
- a reconstruction step of reconstructing, when it is determined in the second determination step that the software to be changed exists in the job processing apparatus and another job processing apparatus, information stored in a software information storage unit in order to execute the software to be changed in said another job processing apparatus; and
- a change holding step of, when it is determined that the software to be changed exists in the job processing apparatus and does not exist in another job processing apparatus, shifting the request to a holding state, wherein the change holding step further comprises:
  - changing, when it is determined that the software to be changed is not used to execute the registered job or it is determined that the software to be changed exists in said another job processing apparatus, the software in accordance with the request, and
  - changing, when the registered job which uses the software to be changed does not exist, the software in accordance with the request which is shift to the holding state.

6. A non-transitory computer readable storage medium storing a computer program for causing a computer to execute:
- a registration step of registering a job;
- a specifying step of specifying a type of software which is used to execute the job registered in said registration step;
- a first determination step of, based on a request to change software, determining whether the software to be changed is the type of the software specified in said specifying step; and
- a second determination step of determining whether there is another job processing apparatus which can execute the software to be changed,
  - wherein, if it is determined that the software to be changed is the type of the software specified in said specifying step and it is determined that there is not another job processing apparatus which can execute the software to be changed, the computer restricts a change of the software according to the request, and
  - wherein, if it is determined that the software to be changed is the type of the software specified in said specifying step and it is determined that there is another job processing apparatus which can execute the software to be changed, the computer performs the change of the software according to the request;
- a reconstruction step of reconstructing, when it is determined in the second determination step that the software to be changed exists in the job processing apparatus and another job processing apparatus, information stored in a software information storage unit in order to execute the software to be changed in said another job processing apparatus; and
- a change holding step of, when it is determined that the software to be changed exists in the job processing apparatus and does not exist in another job processing apparatus, shifting the request to a holding state, wherein the change holding step further comprises:
  - changing, when it is determined that the software to be changed is not used to execute the registered job or it is determined that the software to be changed exists in said another job processing apparatus, the software in accordance with the request, and
  - changing, when the registered job which uses the software to be changed does not exist, the software in accordance with the request which is shift to the holding state.

7. A job processing apparatus which has a rewritable storage unit for storing software and executes a job by using the software, comprising:

a registration unit for registering a job;

a specifying unit for specifying a type of software which is used to execute the job registered by said registration unit;

a first determination unit for, based on a request to change a software, determining whether the software to be changed is the type of the software specified by said specifying unit;

a second determination unit for determining whether another job processing apparatus, with which the job processing apparatus can communicate, has the software to be changed;

wherein, if said first determination unit determines that the software to be changed is the type of the software specified by said specifying unit and said second determination unit determines that said another job processing apparatus does not have the software to be changed, the job processing apparatus restricts a change of the software according to the request, and wherein, if said first determination unit determines that the software to be changed is the type of the software specified by said specifying unit and said second determination unit determines that said another job processing apparatus has the software to be changed, the job processing apparatus performs the change of the software according to the request;

a reconstruction unit for, when said second determination unit determines that the software to be changed exists in the job processing apparatus and another job processing apparatus, reconstructing information stored in a software information storage unit in order to execute the software to be changed in said another job processing apparatus; and a change holding unit for, when said second determination unit determines that the software to be changed exists in the job processing apparatus and does not exist in any other job processing apparatus with which the job processing apparatus can communicate, shifting the request to a holding state wherein said change holding unit comprises:
  a first change unit for, when said first determination unit determines that the software to be changed is not used to execute the registered job or said second determination unit determines that the software to be changed exists in another job processing apparatus, changing the software in accordance with the request; and
  a second change unit for, when the registered job which uses the software to be changed does not exist, changing the software in accordance with the request which is shift to the holding state.

8. The apparatus according to claim 7, wherein the request includes a request of replacement with an upgrade software and a request to delete a software part.

9. The apparatus according to claim 7, wherein the job registered by said registration unit includes a timer job having a designated process execution timing.

10. The apparatus according to claim 7, wherein said specifying unit includes said software information storage unit for storing information for specifying a software which is determined to be used in accordance with a type of the job registered by said registration unit.

11. The apparatus according to claim 10, further comprising:
  a network communication unit for communicating with another job processing apparatus; and
  a search unit for searching the job processing apparatus and another job processing apparatus for a software used to execute a job to be registered by said registration unit,
  wherein said software information storage unit stores information for identifying a software detected by said search unit and information for identifying a job processing apparatus which has the software detected by said search unit.

12. The apparatus according to claim 11, wherein said second determination unit determines whether the software to be changed exists in the job processing apparatus or another job processing apparatus.

13. A job processing apparatus which has a rewritable storage unit for storing software and executes a job by using the software, comprising:
  a job storing unit for storing a timer job for which timing to execute the job is designated;
  a determination unit for, based on a request to change a software, determining whether the software to be changed is used to execute the timer job; and
  a changing unit for, in accordance with the determination that the software to be changed is not used to execute the timer job, changing the software,
    wherein if said determination unit determines that the software to be changed is used to execute the timer job, said changing unit waits for an execution of the timer job, and
    wherein if said job storing unit stores a plurality of jobs, said determination unit determines whether the software to be changed is used to execute each of the plurality of jobs, and said changing unit waits for an execution of a job which does not need the software to be changed and changes the software while the job which does not need the software to be changed is executed.

14. The apparatus according to claim 13, wherein the request is one of a request to replacement the software with an upgrade software and a request to delete the software.

15. The apparatus according to claim 13, further comprising:
  storage unit for storing information specifying a software which is dependent on a type of the timer job and is used to execute the timer job,
  wherein the determination unit refers to the information stored in the storage unit and determines whether the software to be changed is used to execute the timer job.

* * * * *